(12) United States Patent
Lee et al.

(10) Patent No.: US 11,840,372 B2
(45) Date of Patent: *Dec. 12, 2023

(54) CARGO CARRIER

(71) Applicant: FEDERAL EXPRESS CORPORATION, Memphis, TN (US)

(72) Inventors: David M. Lee, Cordova, TN (US); Frank J. LeRose, Collierville, TN (US)

(73) Assignee: FEDERAL EXPRESS CORPORATION, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/654,831

(22) Filed: Mar. 15, 2022

(65) Prior Publication Data

US 2022/0258916 A1   Aug. 18, 2022

Related U.S. Application Data

(63) Continuation of application No. 17/029,159, filed on Sep. 23, 2020, now Pat. No. 11,305,914, which is a
(Continued)

(51) Int. Cl.
  *B65D 19/38*   (2006.01)
  *B65D 19/00*   (2006.01)
  (Continued)

(52) U.S. Cl.
  CPC ............... *B65D 19/38* (2013.01); *B64C 1/20* (2013.01); *B64D 9/003* (2013.01);
  (Continued)

(58) Field of Classification Search
  CPC ........... B65D 2519/00024; B65D 2519/00059; B65D 2519/00094; B65D 2519/00293;
  (Continued)

(56) References Cited

U.S. PATENT DOCUMENTS 2,913,206 A   11/1959   Paris
2,969,170 A   1/1961   Waldorf
(Continued)

FOREIGN PATENT DOCUMENTS

AU   4165472 A   11/1973
CN   1276329 A   12/2000
(Continued)

OTHER PUBLICATIONS

Cargo Pallets and Containers, www.boeing.com/startup, Mar. 2012 (18 pages).
(Continued)

*Primary Examiner* — Janet M Wilkens
(74) *Attorney, Agent, or Firm* — Finnegan, Henderson, Farabow, Garrett & Dunner LLP

(57) ABSTRACT

A cargo pallet is disclosed. The cargo pallet may have a pallet base. The cargo pallet may also have a pallet liner. The pallet liner may have a pallet liner base. The pallet liner base may be positioned on the pallet base. The pallet liner may also have a pallet extension, which may be fixedly attached to the pallet liner base. The pallet extension may project outwardly from the pallet liner base. The pallet extension may also have a support surface that may at least in part extend outwardly beyond a footprint of the pallet base.

20 Claims, 15 Drawing Sheets

Related U.S. Application Data continuation of application No. 16/669,820, filed on Oct. 31, 2019, now Pat. No. 10,815,030, which is a continuation of application No. 16/169,238, filed on Oct. 24, 2018, now Pat. No. 10,501,231, which is a continuation of application No. 15/493,707, filed on Apr. 21, 2017, now Pat. No. 10,138,018.

(51) Int. Cl.
  *B64D 9/00* (2006.01)
  *B64C 1/20* (2006.01)
  *B65D 19/44* (2006.01)

(52) U.S. Cl.
  CPC ..... *B65D 19/0002* (2013.01); *B65D 19/0012* (2013.01); *B65D 19/0059* (2013.01); *B65D 19/44* (2013.01); *B64D 2009/006* (2013.01); *B65D 2519/00024* (2013.01); *B65D 2519/0099* (2013.01); *B65D 2519/00273* (2013.01); *B65D 2519/00288* (2013.01); *B65D 2519/00293* (2013.01); *B65D 2519/00318* (2013.01); *B65D 2519/00323* (2013.01); *B65D 2519/00343* (2013.01); *B65D 2519/00562* (2013.01); *B65D 2519/00572* (2013.01); *B65D 2519/00741* (2013.01); *B65D 2519/00815* (2013.01)

(58) Field of Classification Search
  CPC ......... B65D 2519/00323; B65D 2519/229373; B65D 19/0095; B65D 19/38; B65D 19/44; B65D 19/0012; B65D 19/385; B65D 19/40; B65D 2519/00273; B65D 2519/00278; B65D 2519/00368; B65D 2519/00781; B65D 2519/00796; B65D 2519/00815; B65D 2519/00955; B65D 2519/00572; B65D 2519/00985
  USPC ......... 108/53.1, 53.3, 53.5, 55.1, 51.3, 51.11
  See application file for complete search history.

(56) References Cited

U.S. PATENT DOCUMENTS

| | | |
|---|---|---|
| 3,260,226 A | 7/1966 | Nordgren |
| 3,472,363 A | 10/1969 | Rustin, Jr. |
| 3,831,744 A | 8/1974 | Walden et al. |
| 3,850,116 A | 11/1974 | Mackes |
| 3,964,618 A | 6/1976 | Dreyer |
| 4,044,981 A | 8/1977 | Richter |
| 4,106,735 A | 8/1978 | Partain et al. |
| 4,475,704 A | 10/1984 | Marom et al. |
| 4,796,539 A | 1/1989 | Berrett |
| 4,869,445 A | 9/1989 | Jones et al. |
| 4,986,418 A | 1/1991 | Gwathmey |
| 5,092,541 A | 3/1992 | Tofflemire et al. |
| 5,941,405 A * | 8/1999 | Scales ............... B65D 88/522 220/4.28 |
| 6,186,078 B1 | 2/2001 | Brown |
| 6,308,642 B1 | 10/2001 | Branam et al. |
| 6,311,628 B1 | 11/2001 | Smith et al. |
| 6,490,982 B1 | 12/2002 | Trickett |
| 7,464,978 B1 | 12/2008 | Meeks |
| 7,621,565 B2 | 11/2009 | Ross, Jr. et al. |
| 7,878,126 B2 | 2/2011 | Markert et al. |
| 8,256,621 B2 | 9/2012 | Deiger et al. |
| 10,138,018 B2 | 11/2018 | Lee et al. |
| 10,501,231 B2 | 12/2019 | Lee et al. |
| 10,815,030 B2 | 10/2020 | Lee et al. |
| 2005/0146151 A1 | 7/2005 | Walker |
| 2006/0061116 A1 | 3/2006 | Haaberg |
| 2009/0053033 A1 | 2/2009 | Barbalho et al. |
| 2009/0212047 A1 | 8/2009 | Harman et al. |
| 2009/0242456 A1 | 10/2009 | Goda |
| 2011/0062049 A1 | 3/2011 | Deiger et al. |

FOREIGN PATENT DOCUMENTS

| | | |
|---|---|---|
| CN | 102249031 A | 11/2011 |
| CN | 104229268 A | 12/2014 |
| CN | 204979543 U | 1/2016 |
| DE | 1034104 B | 7/1958 |
| EP | 0233739 | 8/1987 |
| EP | 0949154 A2 | 10/1999 |
| EP | 1834898 A1 | 9/2007 |
| GB | 2157647 | 10/1985 |
| JP | 2009-107719 A | 5/2009 |
| WO | WO 8501263 | 3/1985 |
| WO | WO 97/09240 | 3/1997 |

OTHER PUBLICATIONS

International Search Report and Written Opinion issued in PCT/US2018/027595, dated Jun. 18, 2018 (12 pages).

Office Action in Chinese Application No. 202110891501.3 dated Aug. 26, 2022.

\* cited by examiner

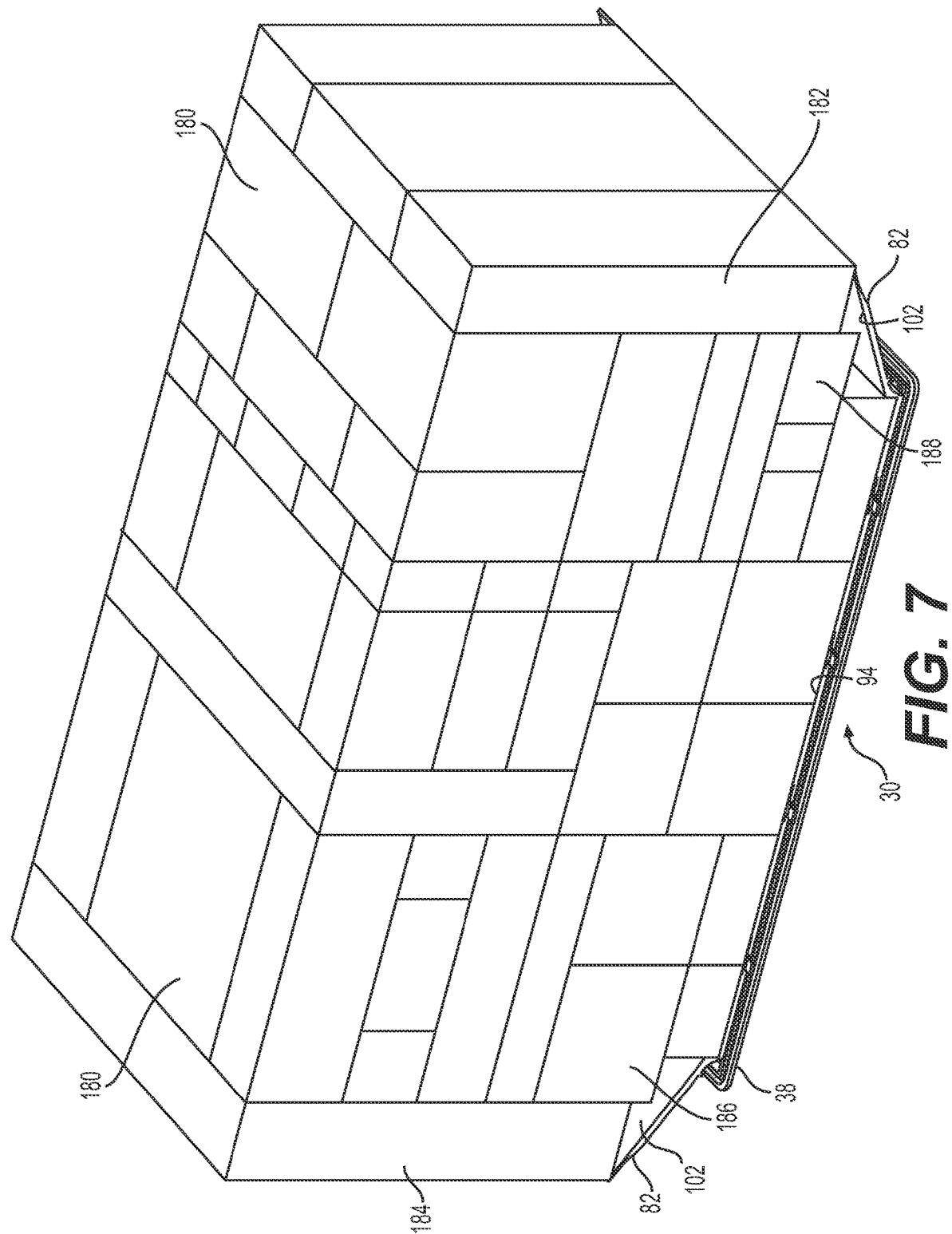

CARGO CARRIER

CROSS REFERENCE TO RELATED APPLICATIONS

This application is a continuation application of and claims the benefit of priority to U.S. patent application Ser. No. 17/029,159, filed on Sep. 23, 2020, which is a continuation application of and claims the benefit of priority to U.S. patent application Ser. No. 16/669,820, filed on Oct. 31, 2019, now U.S. Pat. No. 10,815,030, issued on Oct. 27, 2020, which is a continuation application of and claims the benefit of priority to U.S. patent application Ser. No. 16/169,238, filed on Oct. 24, 2018, now U.S. Pat. No. 10,501,231, issued on Dec. 10, 2019, which is a continuation application of and claims the benefit of priority to U.S. patent application Ser. No. 15/493,707, filed on Apr. 21, 2017, now U.S. Pat. No. 10,138,018, issued on Nov. 27, 2018, the entire contents of all of which are hereby incorporated by reference.

FIELD

The present disclosure relates generally to a cargo pallet, and more particularly, to a cargo pallet having a pallet extension. The disclosure also includes cargo pallets in which the pallet extension is in the form of a platform.

BACKGROUND

Shippers transport a significant amount of freight these days using cargo aircraft or in the cargo holds of passenger aircraft. Because of the high costs associated with transporting cargo by air, shippers try to arrange the cargo in the cargo hold so as to utilize as much of the volume of the cargo hold of an aircraft as possible. Typically, individual packages of cargo are accommodated in a container, which is then loaded into the cargo hold of the aircraft. Such containers, called unit load devices (ULDs) are commonly used in the freight industry. Some ULDs are shaped to conform to the interior contours of a cargo hold.

The side and top walls of the ULDs, however, limit access to the inner volume of the ULDs during loading of the packages into the ULDs. Moreover, the side and top walls of the ULDs themselves occupy some volume, which is not available for placing packages in the ULDs. Some shippers use cargo pallets instead of ULDs. Cargo pallets are typically square or rectangular flat structures on which packages can be stacked. A cargo net is often used to cover the stacked packages. The net is secured to the sides of the pallet to ensure that the packages are not dislodged from the cargo pallet.

Shippers also sometimes employ a modified cargo pallet that has angled panels extending from two edges of the cargo pallet. The angled panels allow for additional space for stacking the packages making up the cargo. To ensure that the angled panels can support the weight of the packages loaded on to the modified pallet, the angled panels are typically connected to the base of the pallet, using support cables or other bars. These support cables or bars, however, are prone to severe damage during loading or movement of the pallet using, for example, a fork lift vehicle or a crane. The support cables or bars also limit access to the base of the cargo pallet during placement of packages on the cargo pallet, making it difficult to use all of the available space on the pallet.

The cargo pallet of the present disclosure represents an improvement over the prior art and solves one or more of the problems set forth above and/or other problems of the prior art.

SUMMARY

In one aspect, the present disclosure is directed to a cargo pallet. The cargo pallet may include a pallet base. The cargo pallet may also include a pallet liner. The pallet liner may include a pallet liner base that may be positioned on the pallet base. The pallet liner may also include a pallet extension, which may be fixedly attached to the pallet liner base. The pallet extension may project outwardly from the pallet liner base. The pallet extension may have a support surface that may at least in part extend outwardly beyond a footprint of the pallet base.

In another aspect, the present disclosure is directed to another cargo pallet. The cargo pallet may include a pallet base. The cargo pallet may also include a pallet liner positioned on the pallet base. Further, the cargo pallet may include a pallet extension fixedly attached to the pallet liner. The pallet extension may project outwardly from the pallet liner. The pallet extension may include a support surface that at least in part extends outwardly beyond a footprint of the pallet base. The pallet extension may be attached to an outer periphery of the pallet liner. The pallet extension may be disposed at an inclination relative to the pallet liner without being connected to the pallet base and the pallet extension may include the support surface. The pallet liner base and the support surface may at least partially define a space for receiving cargo.

In yet another aspect the present disclosure is directed to yet another cargo pallet. The cargo pallet may include a generally rectangular pallet base. The cargo pallet may also include a generally rectangular pallet liner positioned on the pallet base. The pallet liner may overlap at least a portion of the pallet base. The cargo pallet may include a platform connected to the pallet base or to the pallet liner along only one side of the pallet liner without being connected to the pallet base. The platform may include a support plate disposed generally parallel to the pallet liner. The platform may also include a side plate disposed generally inclined to the pallet liner. The side plate may be connected at one end to the one side of the pallet liner and connected at an opposite end to the support plate. The platform may further include a wall extending from the support plate toward the pallet liner base. The wall may include a seating member abutting on the pallet liner. The support plate and the pallet liner may at least partially define a space for receiving cargo.

In another aspect the present disclosure is directed to another cargo pallet. The cargo pallet may include a generally rectangular pallet base. The cargo pallet may also include a platform connected to the pallet base along only one side of the pallet base. The platform may include a platform base disposed on the pallet base. The platform may also include a support plate disposed generally parallel to the pallet base and spaced apart from the platform base. The platform may further include a side plate disposed generally inclined to the pallet base. The side plate may be connected at one end to the platform base and connected at an opposite end to the support plate. In addition, the platform may include an end wall extending from the support plate to the pallet base. The platform and the pallet base may at least partially define a space for receiving cargo.

BRIEF DESCRIPTION OF THE DRAWINGS

The accompanying drawings, which are incorporated in and constitute a part of this disclosure, illustrate exemplary disclosed embodiments of the present disclosure and, together with the description, serve to explain the principles of the present disclosure. In the drawings:

FIG. 7 is a perspective view of an exemplary cargo pallet of FIG. 2 loaded with packages;

DETAILED DESCRIPTION

Figure 1:
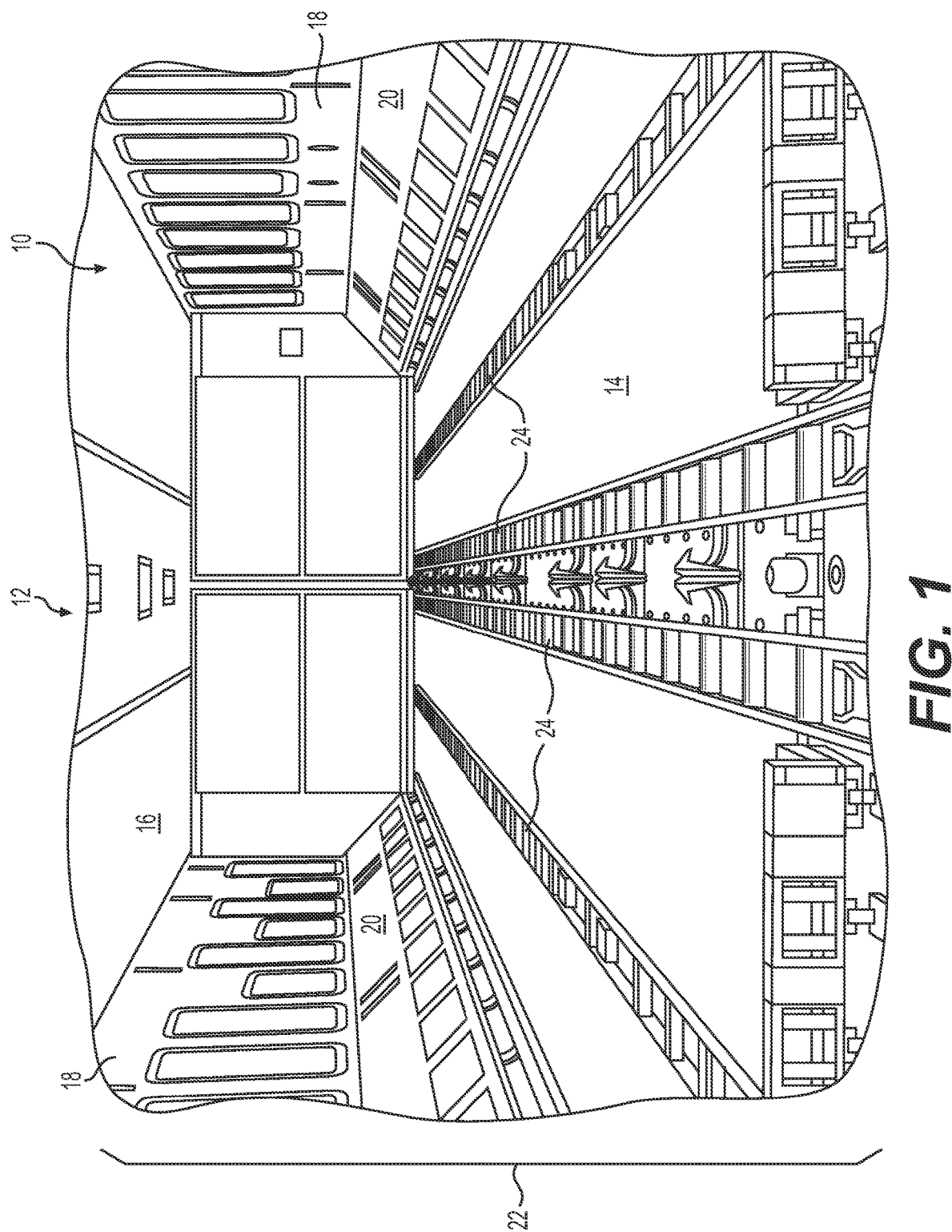
FIG. 1 is a fragmentary view of an exemplary cargo hold.

FIG. 1 illustrates a fragmentary view of an exemplary cargo hold 10. In one exemplary embodiment as illustrated in FIG. 1, cargo hold 10 may be disposed within an aircraft 12. Aircraft 12 may be a cargo aircraft, a passenger aircraft, a military transport aircraft, or any other type of aircraft capable of transporting cargo. It is also contemplated that in some exemplary embodiments, cargo hold 10 may be disposed within a ship, on a vehicle capable of travelling on land, or in a cargo container, which may be transported by an aircraft, by a ship, and or by a land-based vehicle.

Cargo hold 10 may include a floor 14, a ceiling 16, side walls 18, and contoured side walls 20, which may define a cargo volume 22. Floor 14 may include loading equipment 24. In one exemplary embodiment, loading equipment 24 may include rollers (not shown) that may help roll ULDs or cargo pallets into cargo volume 22. It is contemplated that loading equipment may take the form of ramps, conveyor belts, rails, or other type of loading mechanisms to help move cargo into cargo volume 22. It is also contemplated that in some exemplary embodiments, floor 14 may not include loading equipment 24.

Ceiling 16 may be disposed opposite floor 14. Side walls 18 may extend from ceiling 16 towards floor 14. In one exemplary embodiment as illustrated in FIG. 1, cargo hold 10 may have at least two side walls 18 disposed spaced apart from each other. Side walls 18 may have a planar or curved shape. Contoured side walls 20 may extend from side walls 18 to floor 14. In one exemplary embodiment, when cargo hold 10 is disposed in an aircraft 12, side walls 18 and contoured side walls 20 may have a generally curved shape corresponding to the shape of an aircraft cabin or cargo bay.

Figure 2:
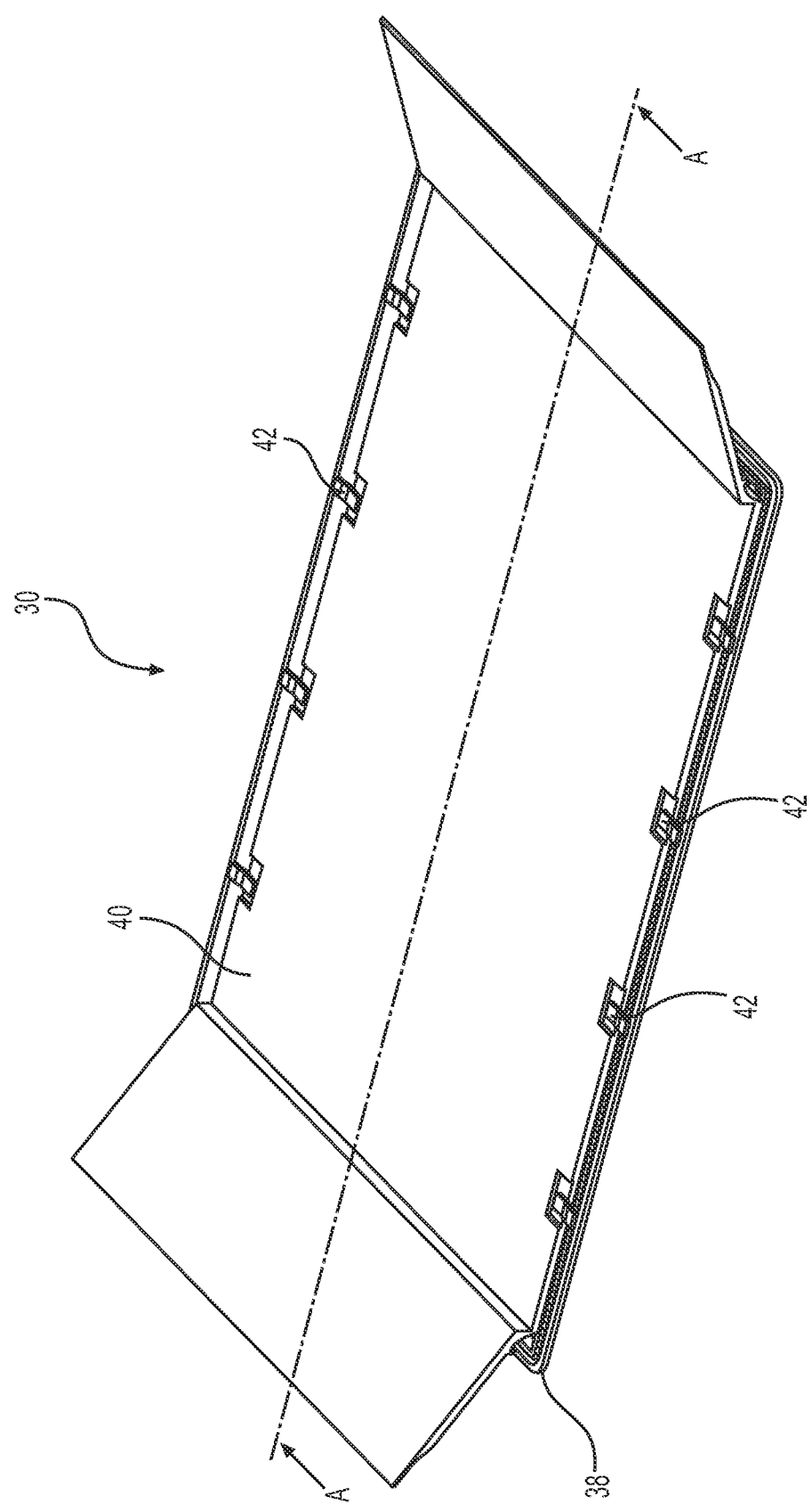
FIG. 2 is a perspective view of an exemplary disclosed cargo pallet.

FIG. 2 illustrates a perspective view of an exemplary disclosed cargo pallet 30. As illustrated in FIG. 2, cargo pallet 30 may include pallet base 38, pallet liner 40, and one or more connectors 42. Pallet liner 40 may be positioned on pallet base 38. Positioning pallet liner 40 on pallet base 38 may include placing pallet liner 40 on pallet base 38. Positioning pallet liner 40 on pallet base 38 may at least partially define a space for receiving cargo. For example, pallet base 38 and pallet liner 40 may define a space in which one or more packages may be arranged for loading in cargo hold 10. Positioning pallet liner 40 on pallet base 38 may increase the available space in which a shipper may stack packages on cargo pallet 30. As shown in FIG. 2, pallet liner 40 provides additional structural support on at least two sides of cargo pallet 30 so that the packages may be stacked on top of each other without the packages falling from or being dislodged from cargo pallet 30. As explained in more detail below, after the packages are loaded onto cargo pallet 30, a cargo net may be placed over the load and attached to cargo pallet 30, before cargo pallet 30 and the load are placed in cargo hold 10 for transporting cargo pallet 30 with the load.

As illustrated in FIG. 2, pallet liner 40 may be detachable (or removable) from pallet base 38 and may be positioned directly onto the pallet base. As explained in more detail below, pallet liner 40 includes extensions that extend beyond the footprint of pallet base 38 and increase the surface available to support the packages and/or other materials that may be loaded onto cargo pallet 30. Pallet liner 40 may be detachably (or removably) connected to pallet base 38 via one or more connectors 42. It is contemplated, however, that in some exemplary embodiments, pallet liner 40 may be fixedly attached to pallet base 38 by, for example, riveting, welding, brazing, with an adhesive, or by other means of attachment. It is also contemplated that in some exemplary embodiments, pallet liner 40 may be positioned on pallet base 38 without being fixedly or detachably connected to pallet base 38.

Pallet base 38 and pallet liner 40 have been illustrated in FIG. 2 as having generally rectangular shapes. In the embodiment shown, pallet base 38 and a base of pallet liner 40 may have the same general shape and size, with the base of the pallet liner 40 fitting onto pallet base 38, with the exterior portions of the pallet base 38 extending slightly beyond the base of pallet liner 40. It is contemplated, however, that pallet base 38 and pallet liner 40 may have any shape. It is also contemplated that a shape of pallet liner 40 may be the same as or different from that of pallet base 38.

Figure 3:
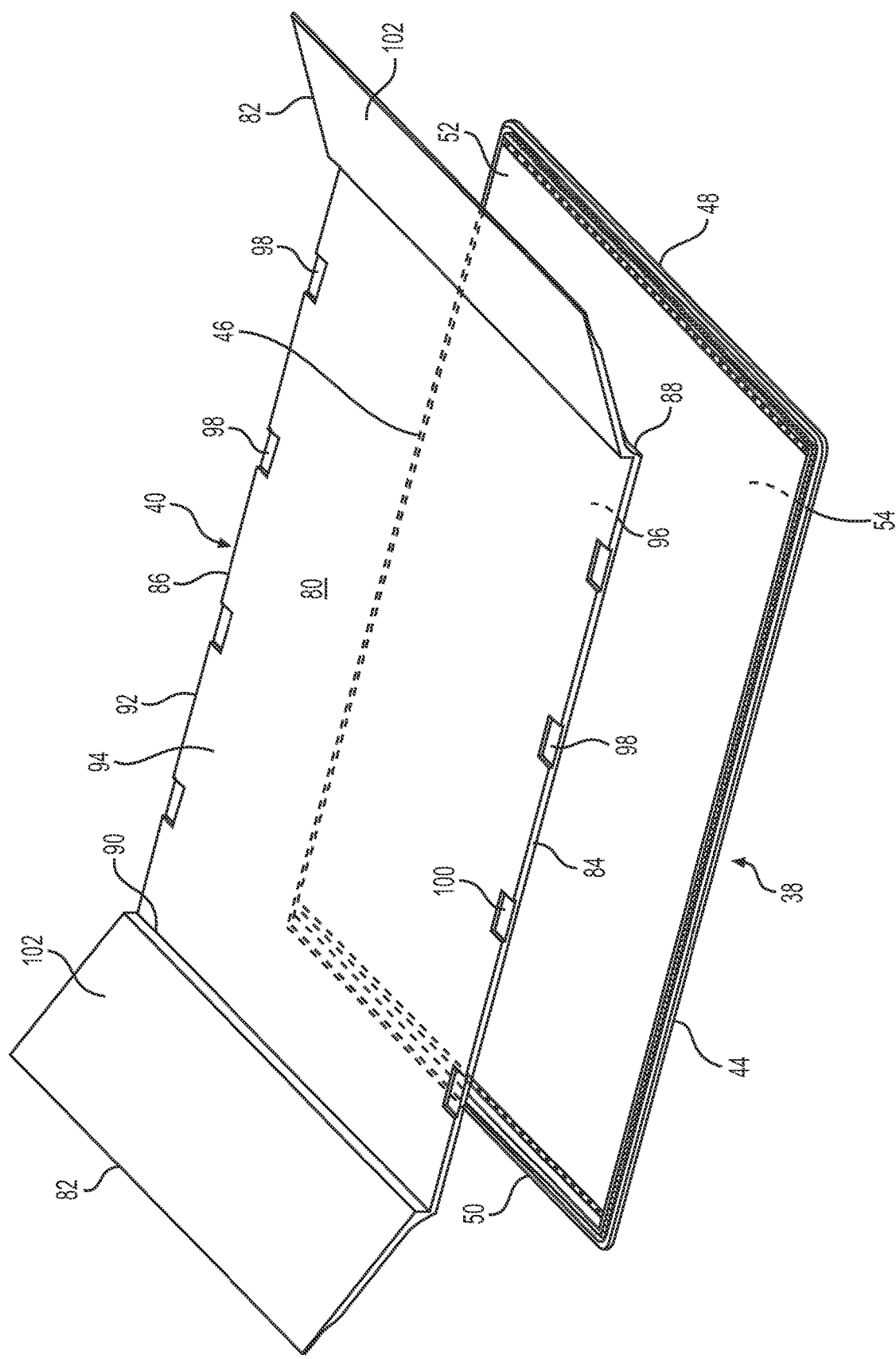
FIG. 3 is an exploded perspective view of the cargo pallet of FIG. 2, showing a pallet base and a pallet liner above the pallet base.

FIG. 3 illustrates an exploded perspective view of cargo pallet 30. Connectors 42 have been omitted from FIG. 3 to improve clarity. As illustrated in the exemplary embodiment of FIG. 3, pallet base 38 may have a shape defined by sides 44, 46, 48, and 50, which may define a footprint of pallet base 38. Sides 44 and 46 may be spaced apart from each other and may be disposed opposite each other. Sides 48 and 50 may also be spaced apart from each other and may be disposed opposite each other. Sides 48 and 50 may each connect sides 44 and 46. In one exemplary embodiment as illustrated in FIG. 3, sides 44 and 46 may be disposed generally parallel to each other, and sides 48 and 50 may be disposed generally parallel to each other. In another exemplary embodiment as illustrated in FIG. 3, in which pallet base 38 may have a generally rectangular shape, sides 44 and 46 may be disposed generally perpendicular to sides 48 and 50. Pallet base 38 may also include upper surface 52 and lower surface 54. As used in this disclosure the term "generally perpendicular" encompasses mechanical structures that are oriented at angles ranging between 90°±1° relative to each other.

Figure 4:
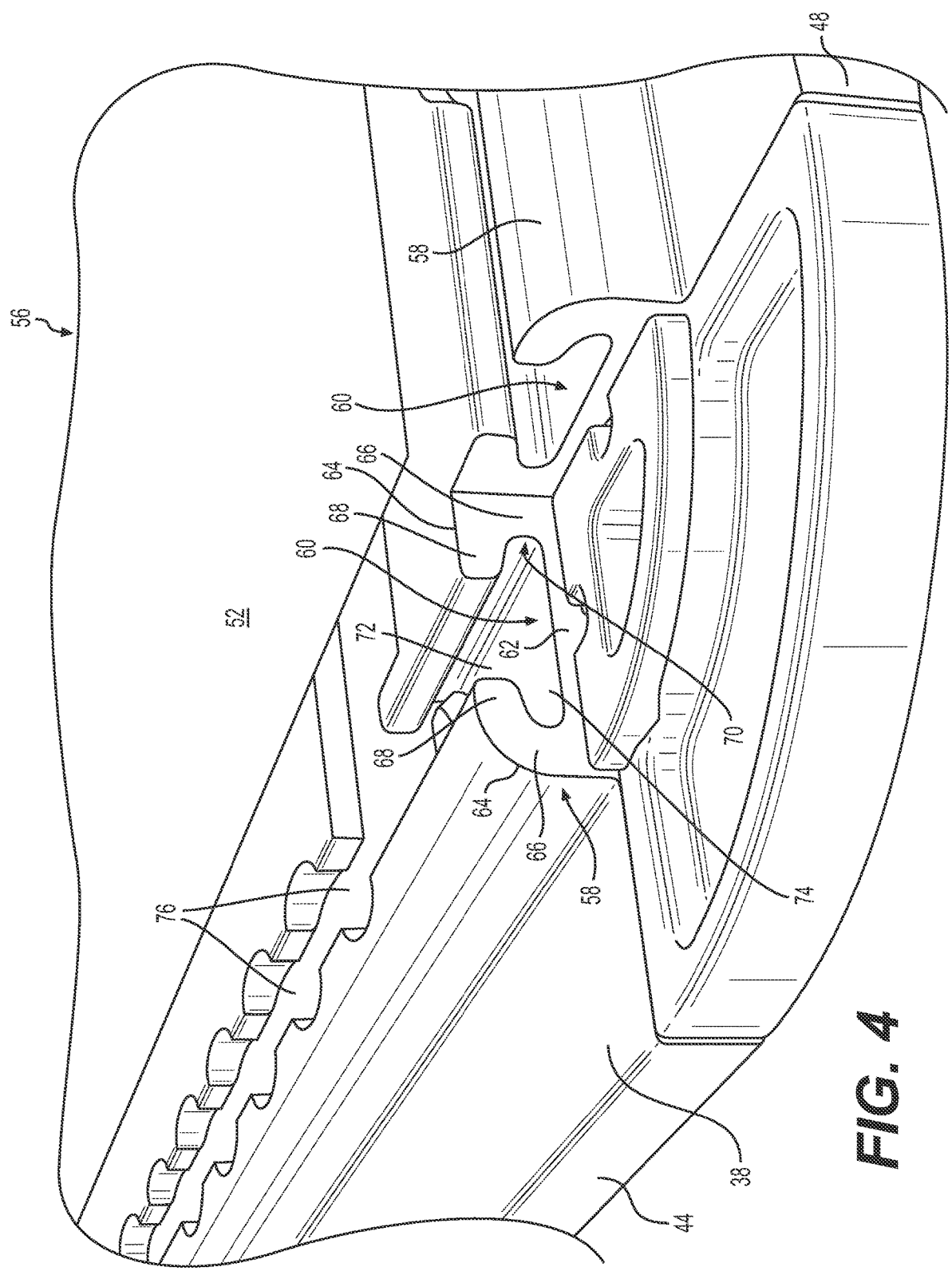
FIG. 4 is a magnified fragmentary view of a corner portion of an exemplary disclosed pallet base of the cargo pallet of FIG. 2.

FIG. 4 illustrates a magnified fragmentary view of corner 56 formed by sides 44 and 48 of pallet base 38. As illustrated in FIG. 4, each of sides 44, 46, 48, and 50 may include rail 58. Rail 58 may be disposed along each of sides 44, 46, 48, and 50. Rail 58 may be generally U-shaped and may include slot 60 extending along a length of rail 58. Rail 58 may have rail base 62 disposed nearer to lower surface 54 of pallet base 38 compared to upper surface 52 of pallet base 38. Rail 58 may include projections 64 extending from rail base 62 towards upper surface 52. Projections 64 may be spaced apart from each other and may be disposed on opposing sides of rail base 62. Each projection 64 may have stem portion 66 and ledge 68. Stem portion 66 may extend outwardly from rail base 62 to stem distal end 70. In one exemplary embodiment as illustrated in FIG. 4, stem portion 66 may be disposed generally perpendicular to rail base 62. Ledges 68 of projections 64 may extend towards each other from stem distal ends 70. In one exemplary embodiment as illustrated in FIG. 4, ledges 68 may be disposed generally perpendicular to stem portions 66. It is contemplated, however, that in some exemplary embodiments, ledges 68 may be inclined relative to stem portions 66. As used in this disclosure the term inclined indicates that an acute angle between two inclined structures may range between about 5° and 85°.

Stem portions 66 and ledges 68 may form a generally inverted T-shaped slot 60. Thus, for example, slot 60 may include neck 72 and slot base 74, which may be wider than neck 72. Slot base 74 may be disposed between rail base 62 and ledges 68. Neck 72 may extend from slot base 74 through a thickness of each ledge 68.

As also illustrated in FIG. 4, slot 60 may include openings 76, which may be spaced apart from each other. A spacing between openings 76 may be uniform or non-uniform. Each opening 76 may have a generally circular shape although other shapes are also contemplated. Openings 76 may extend through a thickness of ledges 68 and may connect with slot base 74. It is contemplated that slot 60 and openings 76 may help attach other components (not shown) to pallet base 38 via one or more fasteners. For example, a head (not shown) of a bolt (not shown) may be disposed in slot base 74 between rail base 62 and ledges 68 so that the bolt may project outward from slot 60 through opening 76. A nut (not shown) may engage with the outwardly projecting bolt to attach other components to pallet base 38. Although only one corner 56 is illustrated in FIG. 4, it is contemplated that corners 56 may also be disposed at the intersections of sides 44 and 50, sides 46 and 48, and sides 46 and 50 of pallet base 38.

Returning to FIG. 3, pallet liner 40 may include pallet liner base 80 and one or more pallet extensions 82. In one exemplary embodiment as illustrated in FIG. 3, pallet liner base 80 may have a shape defined by sides 84, 86, 88, and 90. Sides 84, 86, 88, and 90 may define an outer periphery 92 of pallet liner base 80. Sides 84 and 86 may be spaced apart from each other and may be disposed opposite each other. Sides 88 and 90 may also be spaced apart from each other and may be disposed opposite each other. Sides 88 and 90 may each connect sides 84 and 86. In one exemplary embodiment, sides 84 and 86 may be disposed generally parallel to each other, and sides 88 and 90 may be disposed generally parallel to each other. In another exemplary embodiment as illustrated in FIG. 3, in which pallet liner base 80 may have a generally rectangular shape, sides 84 and 86 may be disposed generally perpendicular to sides 88 and 90. As also illustrated in the exemplary embodiment of FIG. 3, sides 84, 86, 88, and 90 of pallet liner base 80 may be disposed generally parallel to sides 44, 46, 48, and 50, respectively, of pallet base 38. Pallet liner base 80 may also include liner upper surface 94 and liner lower surface 96, which may be disposed opposite upper surface 52 of pallet base 38. In one exemplary embodiment pallet liner 40 may be disposed on pallet base 38 so that liner lower surface 96 may abut on upper surface 52 of pallet base 38. A size of pallet liner base 80 may be about equal to or different from a size of pallet base 38.

Pallet liner base 80 may include one or more notches 98. As illustrated in the exemplary embodiment of FIG. 3, notches 98 may be disposed along sides 84 and 86 of pallet liner base 80. A spacing between notches 98 may be uniform or non-uniform. It is also contemplated that a number of notches 98 along sides 84 and 86 may be equal or unequal. Each notch 98 may extend from liner upper surface 94 towards liner lower surface 96. It is contemplated that a depth of notch 98 may be smaller than a thickness of pallet liner 40. Thus, for example, as illustrated in FIG. 3, notch upper surface 100 may be disposed vertically offset from liner upper surface 94 and may be disposed between liner upper surface 94 and liner lower surface 96. It is contemplated that notches 98 may have a square, circular, semicircular, elliptical, polygonal, or other shape. In some exemplary embodiments, notches 98 on side 84 may be disposed directly opposite notches 98 on side 86. In other exemplary embodiments, notches 98 on side 84 may be disposed in a staggered arrangement between notches 98 on side 86. As will be described in detail below, notches 98 may allow pallet liner base 80 to be detachably connected to pallet base 38 at one or both of opposing and spaced apart sides 44 and 46 of pallet base 38.

As illustrated in the exemplary embodiment of FIG. 3, pallet extensions 82 may project outwardly from an outer periphery 92 of pallet liner base 80. In some exemplary embodiments, pallet extensions 82 may be fixedly attached to pallet liner base 80. As illustrated in the exemplary embodiment of FIG. 3, pallet extensions 82 may be fixed to outer periphery 92 of pallet liner base 80 at each of sides 88 and 90 of pallet liner base 80. Each pallet extension 82 may include support surface 102, which may support one or more packages. As illustrated in FIG. 3, support surfaces 102 of pallet extensions 82 may be fixed to outer periphery 92 of pallet liner base 80 at sides 88 and 90. Pallet extension 82 and support surface 102 may at least in part extend outwardly beyond a footprint of pallet liner base 80 and also beyond a footprint of the pallet base 38. In one exemplary embodiment as illustrated in FIG. 3, the footprint of pallet liner base 80 may be defined by sides 84, 86, 88, and 90. As also illustrated in the exemplary embodiment of FIG. 3, pallet extension 82 and support surface 102 may be generally inclined relative to pallet liner base 80.

In one exemplary embodiment, pallet extension 82 and support surface 102 may be inclined at an angle ranging between about 30° and about 45° relative to pallet liner base 80. The inclination of pallet extension 82 may be chosen to conform generally to the shape of a wall of cargo hold 10 into which cargo pallet 30 may be loaded. As used in this disclosure, the term about connotes typical manufacturing or machining tolerances. Thus, for example, the term "about 30°" connotes angles ranging between 30°±1°. It is contemplated that in some embodiments, pallet extension 82 and support surface 102 may be generally co-planar with pallet liner base 80. As used in this disclosure the term "generally co-planar" encompasses mechanical structures that are oriented at angles ranging between 0°±1° relative to each other. In yet other exemplary embodiments, pallet extension 82 and support surface 102 may be disposed generally perpendicular to pallet liner base 80.

In one exemplary embodiment as illustrated in FIG. 3, pallet extension 82 and support surface 102 may have a generally rectangular shape. It is contemplated, however, that pallet extension 82 and support surface 102 may have a triangular, polygonal, circular, elliptical, or other shape. Although two pallet extensions 82 disposed opposite to each other and spaced apart from each other are illustrated in FIG. 3, it is contemplated that in some exemplary embodiments, cargo pallet 30 may have only one pallet extension 82 extending outwardly from one of sides 88 or 90 of pallet liner base 80. It is also contemplated that in other exemplary embodiments, cargo pallet 30 may have any number of pallet extensions 82 extending outwardly from outer periphery 92 of pallet liner base 80.

Figure 5:
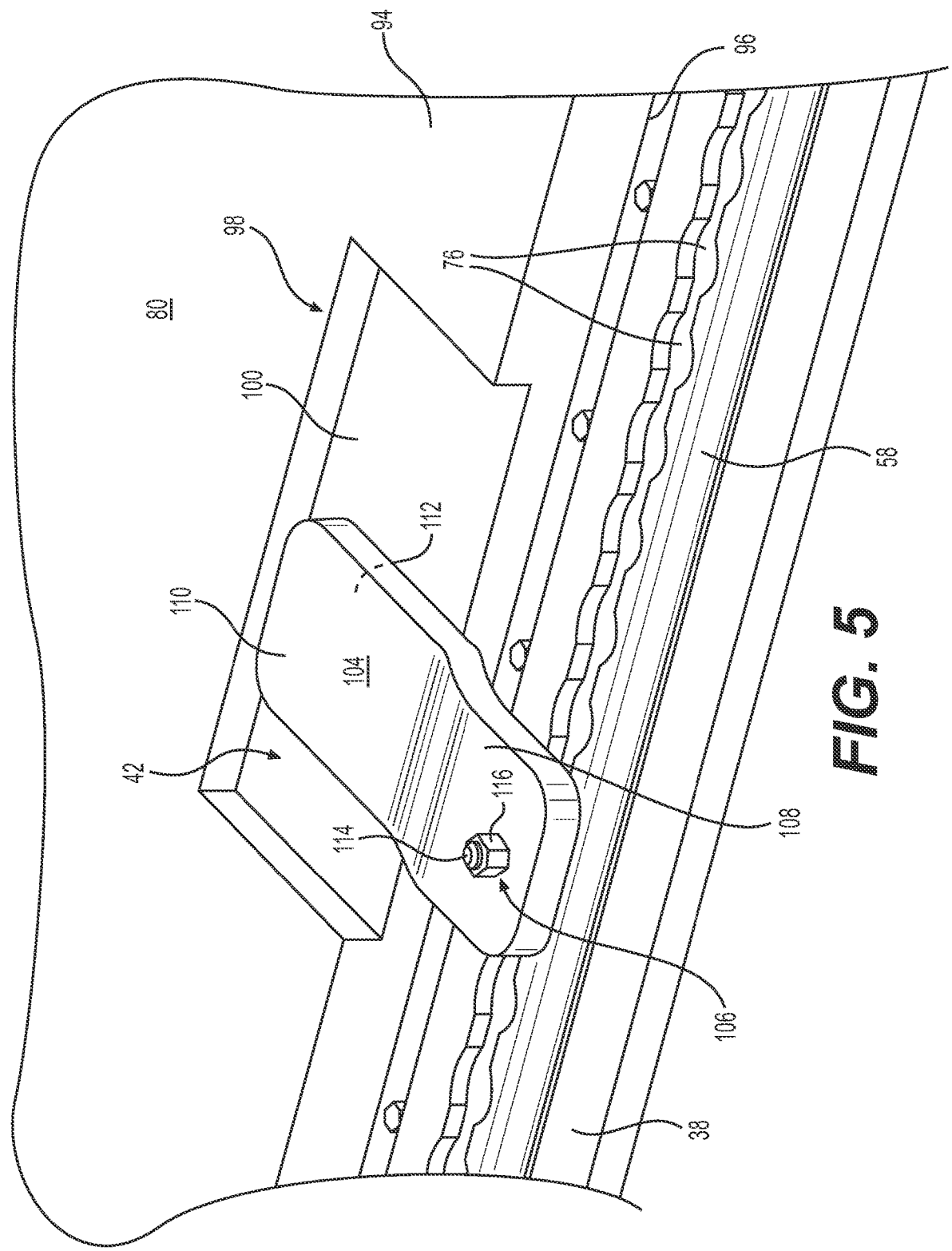
FIG. 5 is a perspective view illustrating an exemplary disclosed fastener of the cargo pallet of FIG. 2.

FIG. 5 illustrates a perspective view of an exemplary connector 42. Connector 42 may include bracket 104 which may be connected to one or more of openings 76 via one or more fasteners 106. Bracket 104 may include pallet base portion 108 and pallet liner portion 110. Pallet base portion 108 and pallet liner portion 110 may both be planar plate like members. Pallet base portion 108 may be vertically offset relative to pallet liner portion 110 along a thickness of bracket 104. Pallet liner portion 110 may be disposed within notch 98 of pallet liner base 80. For example, as illustrated in FIG. 5, lower surface 112 of pallet liner portion 110 may abut on notch upper surface 100, such that pallet liner base 80 of pallet liner 40 may be slidingly disposed between bracket 104 and pallet base 38.

Pallet base portion 108 of bracket 104 may include an opening (not shown) through which fastener 106 may pass to connect bracket 104 with pallet base 38. In one exemplary embodiment as illustrated in FIG. 5, fastener 106 may include bolt 114, which may pass through opening 76 in rail 58 of pallet base 38 and through the opening in pallet base portion 108. Nut 116 may engage with bolt 114 to detachably connect bracket 104 to rail 58 of pallet base 38. Tightening nut 116 may help ensure that pallet liner base 80 of pallet liner 40 may be sandwiched between bracket 104 and pallet base 38. It is contemplated that pallet liner 40 may be detachably attached to pallet base 38 via any number of connectors 42.

Although a particular geometry of connector 42 has been illustrated in FIG. 5 and described above, the scope of the present disclosure is not limited to the disclosed embodiment of connector 42. Pallet liner 40 may be detachably attached to pallet base 38 in many different ways. For example, in some exemplary embodiments, pallet liner 40 may include openings (not shown), and fastener 106 may pass through openings 76 in pallet base 38 and the openings in pallet liner 40 to attach pallet liner 40 to pallet base 38. Many other types of connectors and or clamping mechanisms may be used to detachably connect pallet liner 40 to pallet base 38.

Figure 6A:
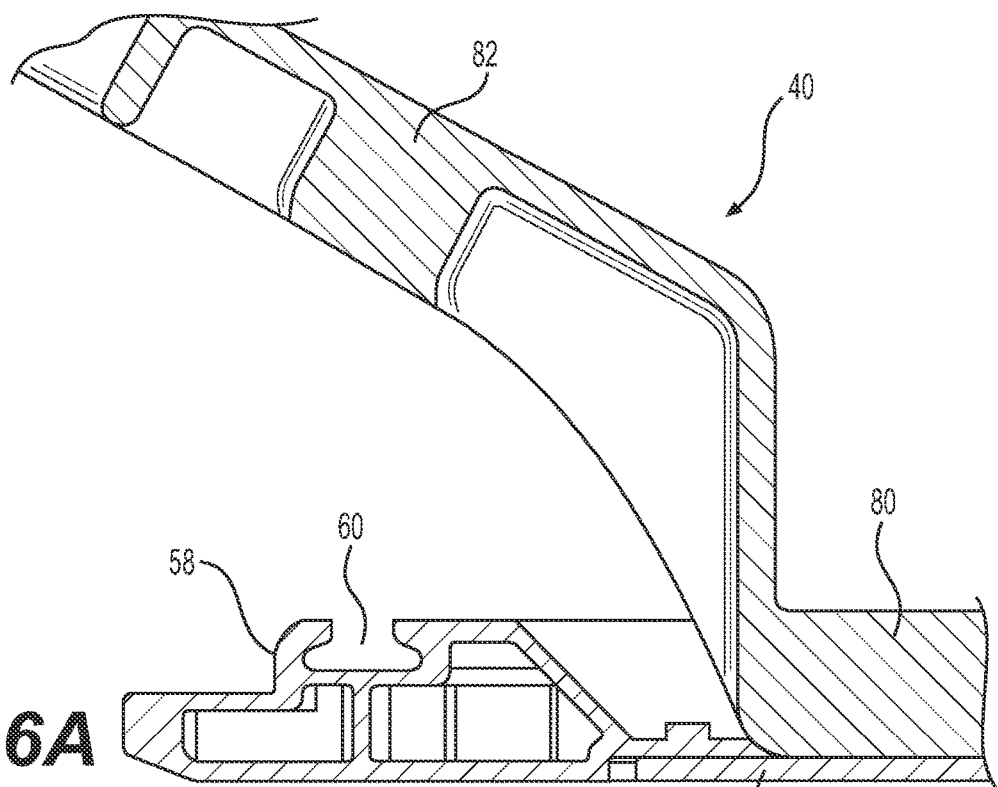
FIG. 6A is a fragmentary cross-sectional view of an exemplary cargo pallet of FIG. 2.

FIG. 6A illustrates a fragmentary cross-sectional view along axis A-A (see FIG. 2) of an exemplary embodiment of cargo pallet 30. Only a portion of the cross-section of cargo pallet 30 is illustrated in FIG. 6A for clarity. As illustrated in FIG. 6A, pallet liner base 80 may be positioned on pallet base 38. Pallet extension 82 may be attached to pallet liner base 80 and may extend outwardly from pallet liner base 80. In one exemplary embodiment as illustrated in FIG. 6A, pallet extension 82 may be connected only to pallet liner base 80 without being connected to any portion of pallet base 38. As also illustrated in the exemplary embodiment of FIG. 6A, pallet extension 82 and pallet liner base 80 may form a unitary integrated structure. A shape and material composition of pallet liner base 80 and pallet extension 82 may be selected such that pallet liner 40 may be able to support the weight of the packages loaded on cargo pallet 30 without the need for any additional support members or structures. In one exemplary embodiment, pallet liner 40 may be made out of a metal composite of aluminum or steel.

Figure 6B:
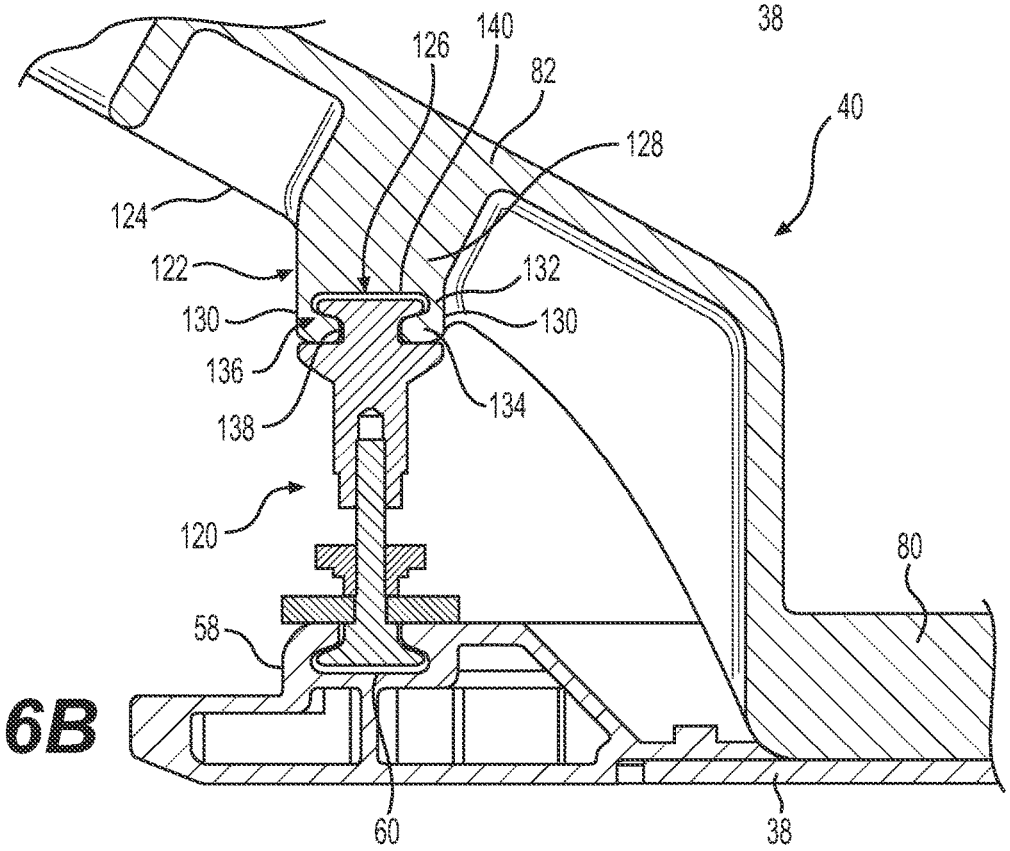
FIG. 6B is a fragmentary cross-sectional view illustrating an exemplary strut and associated support structure which may be used with the cargo pallet of FIG. 2.

FIG. 6B illustrates a fragmentary cross-sectional view along axis A-A (see FIG. 2) of another exemplary embodiment of cargo pallet 30. Only a portion of the cross-section of cargo pallet 30 is illustrated in FIG. 6B for clarity. As illustrated in FIG. 6B, pallet liner base 80 may be positioned on pallet base 38. Pallet extension 82 may be attached to pallet liner base 80 and may extend outwardly from pallet liner base 80. Pallet extension 82 may also be connected to pallet base 38 via one or more structural supports or struts 120. For example, pallet extension 82 may be connected to rail 58 on one or both of sides 48 and 50 of pallet base 38 via one or more struts 120, which may connect a portion of outer surface 124 of pallet extension 82 with a portion of pallet base 38.

As illustrated in FIG. 6B, outer surface 124 of pallet extension 82 may be generally inclined relative to pallet liner base 80. Rail 122 may be disposed on outer surface 124 of pallet extension 82. Rail 122 may extend generally parallel to sides 88 and/or 90 of pallet liner base 80, and along a length of pallet extension 82. Rail 122 may have a structure and function similar to that of rail 58. For example, like rail 58, rail 122 may be generally U-shaped and may include slot 126 extending along a length of rail 122. Rail 122 may have rail base 128 disposed adjacent outer surface 124. In some exemplary embodiments, outer surface 124 of pallet extension 82 may be shaped to conform generally with side wall 18 and/or contoured side wall 20 of cargo hold 10. Rail 122 may also include projections 130 extending outward from rail base 128 towards pallet liner base 80. Projections 130 may be spaced apart from each other and may be disposed on opposite sides of rail 122. Each projection 130 may have stem portion 132 and a ledge 134. Stem portion 132 may extend outward from rail base 128 to stem distal end 136. In one exemplary embodiment as illustrated in FIG. 6B, stem portion 132 may be disposed generally perpendicular to rail base 128. In other exemplary embodiments, stem portion 132 may be inclined relative to rail base 128. Ledges 134 of projections 130 may extend towards each other from stem distal ends 136. In one exemplary embodiment as illustrated in FIG. 6B, ledges 134 may be disposed generally perpendicular to stem portions 132. In other exemplary embodiments, ledges 134 may be inclined relative to stem portions 132.

Stem portions 132 and ledges 134 may form a generally T-shaped slot 126. Thus, for example, slot 126 may include neck 138 and slot base 140, which may be wider than neck 138. Slot base 140 may be disposed between rail base 128 and ledges 134. Neck 138 may extend from slot base 140 through a thickness of each ledge 134. Like the exemplary embodiment of FIG. 6A, pallet extension 82 and pallet liner base 80 of the embodiment illustrated in FIG. 6B may form a unitary integrated structure. In one exemplary embodiment, pallet liner 40 may be made out of a metal composite of aluminum or steel.

Figure 6C:
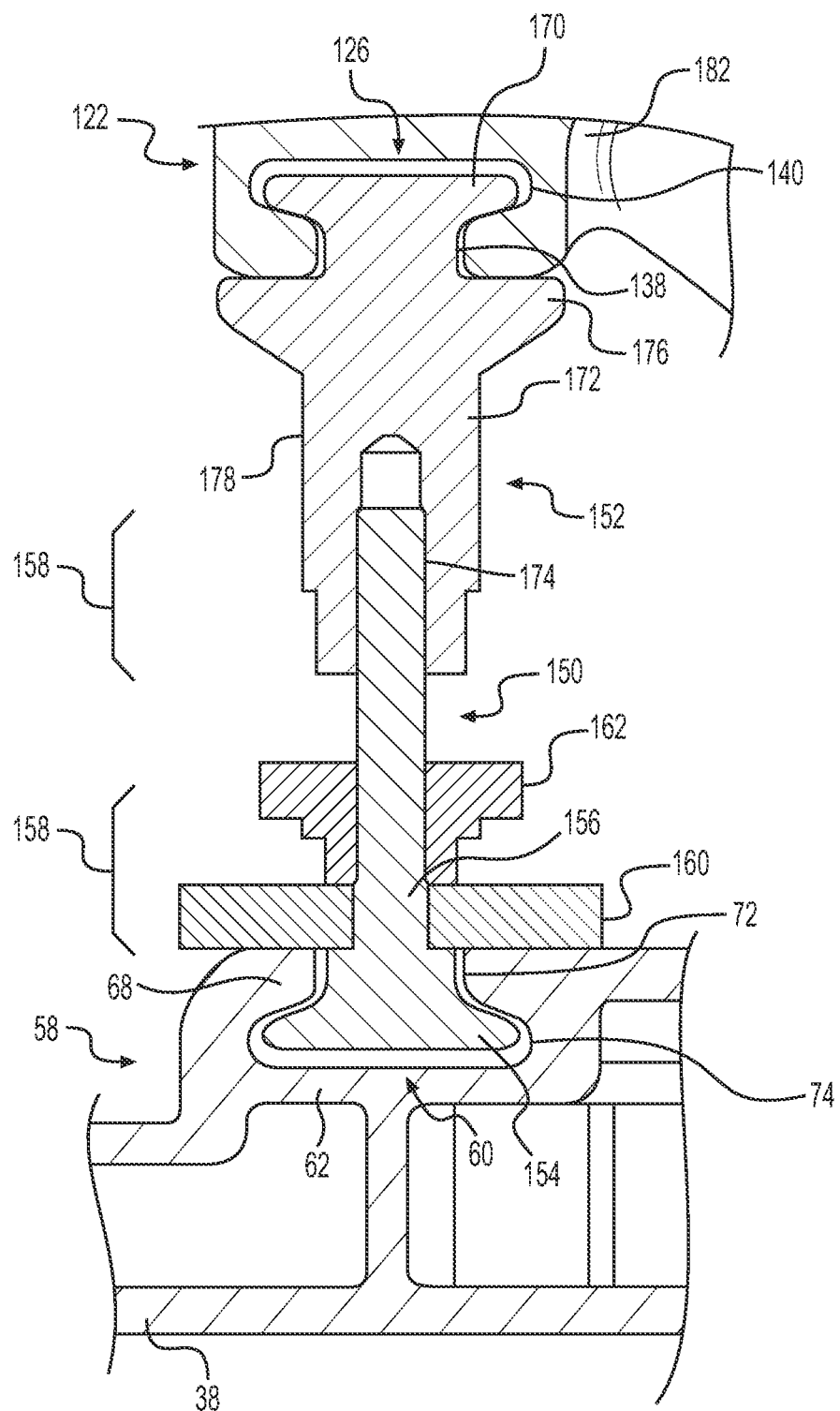
FIG. 6C is a magnified cross-sectional view illustrating assembly of an exemplary structural support or strut of FIG. 6B.

FIG. 6C illustrates a magnified fragmentary cross-sectional view of an exemplary structural support or strut 120 connected at one end to pallet extension 82 and connected at an opposite end to pallet base 38. In some exemplary embodiments, strut 120 may be connected to one or more openings 76 in rail 58 of pallet base 38. As illustrated in the exemplary embodiment of FIG. 6C, strut 120 may have base portion 150 and extension portion 152. Base portion 150 of strut 120 may engage with rail 58 of pallet base 38. Extension portion 152 of strut 120 may engage with rail 122 of pallet extension 82. Base portion 150 may include head 154 and shank 156. Head 154 may be wider than shank 156. Head 154 of base portion 150 may be received in slot base 74 of slot 60 in rail 58. Head 154 may be disposed between rail base 62 and ledges 68. Shank 156 may pass through neck 72 of slot 60 and/or openings 76 in rail 58. Shank 156 may include one or more threaded portions 158. Shank 156 may pass through washer 160, which may rest on top of ledges 68 of rail 58. Fastener 162 may also be threaded and may engage with a threaded portion 158 of shank 156. Washer 160 and fastener 162 may cooperate to help firmly attach head 154 into slot 60 of rail 58. In some exemplary embodiments, fastener 162 may be a lock nut. In other exemplary embodiments, a lock nut (not shown) in addition to fastener 162 may be used to help ensure that head 154 is firmly attached into slot 60 of rail 58.

As also illustrated in the exemplary embodiment of FIG. 6C, extension portion 152 may include head 170 and shank 172. Head 170 may be wider than shank 172. Head 170 of extension portion 152 may be received in slot base 140 of slot 126 in rail 122. Head 170 may be disposed between rail base 128 and ledges 134. Shank 172 may pass through neck 138 of slot 126 in rail 122. Shank 172 may include a bore 174, which may be threaded. Bore 174 may engage with at least one threaded portion 158 of shank 156 of base portion 150. Strut 120 may have an adjustable length along an axial direction of strut 120. For example, shank 172 may be rotated to adjust a height of strut 120 and to ensure that head 170 is firmly attached into slot 126 of rail 122. In one exemplary embodiment shank 172 may have a flange 176 extending radially outward from outer surface 178 of shank 172. Flange 176 may abut on ledges 134 of rail 122 so that ledges 134 may be disposed between head 170 and flange 176. Strut 120 may be configured to transfer at least a portion of a weight of the packages loaded on pallet liner 40 to pallet base 38, thereby adding to the structural integrity and strength of the cargo pallet 30 with the pallet extensions 82 to support a load of packages 180.

Although a particular geometry of strut 120 has been illustrated in FIGS. 6B and 6C, and described above, the scope of the present disclosure is not limited to the disclosed embodiment of strut 120. Pallet extensions 82 of pallet liner 40 may be connected to pallet base 38 in many different ways. For example, in some exemplary embodiments, a unitary structural member may be fastened on one end to rail 58 of pallet base 38 and on an opposite end to rail 122 of pallet extension 82 via one or more fasteners. In another exemplary embodiment, the unitary structural member may be welded or brazed to pallet base 38 and to pallet extension 82. Many other types of structural supporting members may be interposed between pallet base 38 and pallet extensions 82 to provide additional structural support to pallet extensions 82.

FIG. 7 illustrates cargo pallet 30 loaded with packages 180. As illustrated in FIG. 7, packages 180 may be loaded so that packages 180 may be stacked on liner upper surface 94 and support surfaces 102 of pallet extensions 82. As also illustrated in FIG. 7, support surfaces 102 allow the surface available for loading packages to be extended beyond liner upper surface 94. For example, as illustrated in FIG. 7, packages 182 and 184 may be supported on support surfaces 102 instead of on liner upper surface 94. Additionally, packages 186 and 188, for example, may be at least partially supported by support surfaces 102 of pallet extensions 82. In some exemplary embodiments, a cargo net (not shown) may be placed over packages 180, 182, 184, 186, and 188. The cargo net may be attached to attachment features (not shown) on one or more of pallet base 38 and/or pallet extensions 82 to securely attach the cargo net to cargo pallet 30. The attachment features may take the form of, for example, hooks, fasteners, extendable belts or other types of attachment features.

Figure 8:
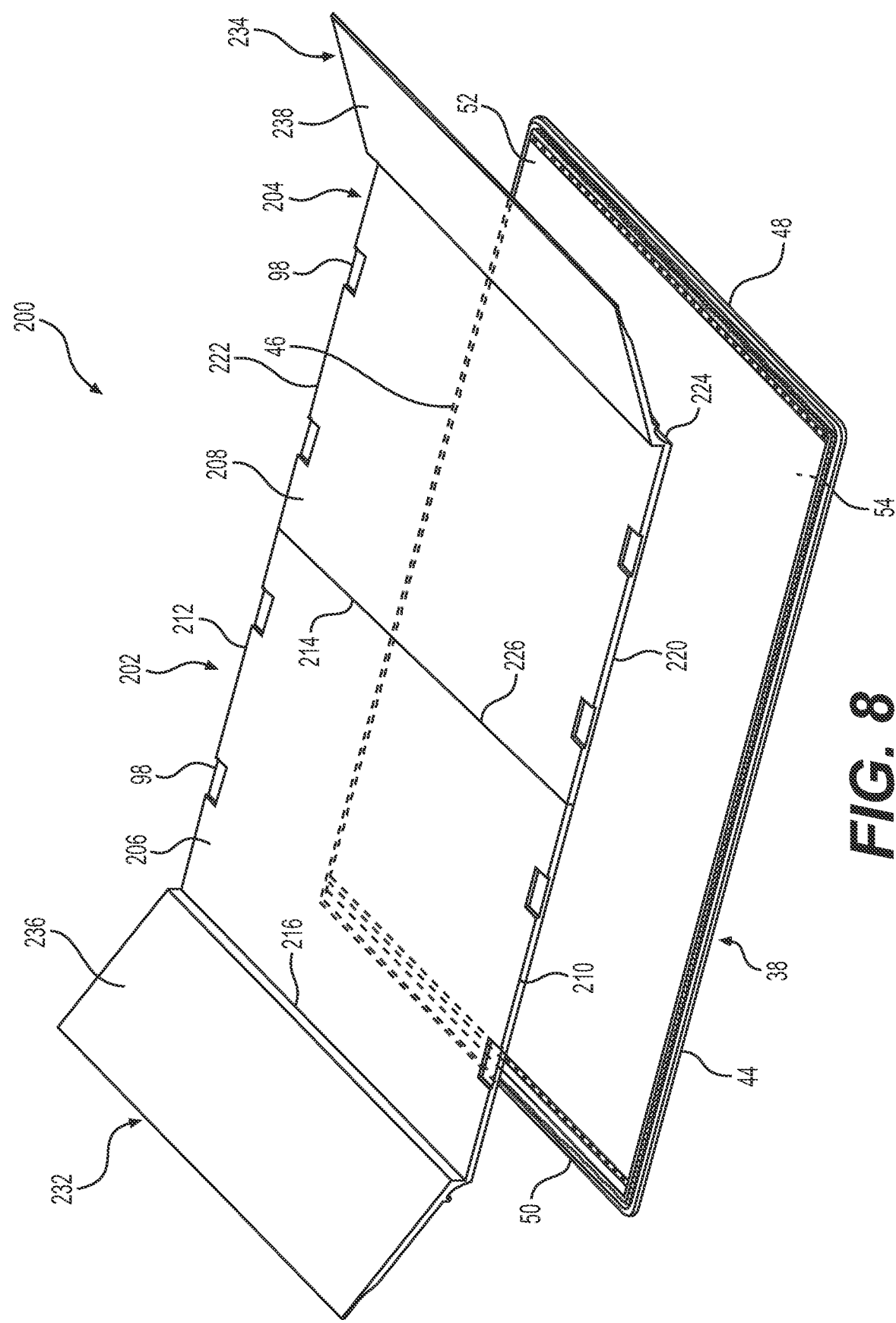
FIG. 8 is an exploded perspective view of another exemplary disclosed cargo pallet.

FIG. 8 illustrates an exploded perspective view of an exemplary cargo pallet 200. Cargo pallet 200 includes pallet base 38, pallet liners 202 and 204, and connectors 42, which have been omitted from FIG. 8 to improve clarity. Pallet liners 202 and 204 may be positioned on pallet base 38. Positioning pallet liners 202 and 204 on pallet base 38 may include placing pallet liners 202 and 204 on pallet base 38. Positioning pallet liners 202 and 204 on pallet base 38 may at least partially define a space for receiving cargo. For example, pallet base 38 and pallet liners 202 and 204 may define a space in which packages 180 may be arranged for loading in cargo hold 10. As illustrated in FIG. 8, and with reference to FIG. 2, positioning one or more of pallet liners 202 and 204 on pallet base 38 may increase the available space in which a shipper may stack packages 180 on cargo pallet 200. Additionally, pallet liners 202 and 204 provide additional structural support on at least two sides of cargo pallet 200 so that packages 180 may be stacked on top of each other without the packages 180 falling from or being dislodged from cargo pallet 200.

In one exemplary embodiment, pallet liners 202 and 204 may be detachably (or removably) connected to pallet base 38 via one or more connectors 42. It is contemplated, however, that pallet liners 202 and 204 may be fixedly attached to pallet base 38 by, for example, riveting, welding, brazing, with an adhesive, or by other means of attachment. It is also contemplated that in some exemplary embodiments, pallet liners 202 and 204 may be positioned on pallet base 38 without being fixedly or detachably connected to pallet base 38. Pallet liners 202 and 204 have been illustrated in FIG. 8 as having generally rectangular shapes. It is contemplated, however, that pallet liners 202 and 204 may have any shape. It is also contemplated that the shapes and sizes of pallet base 38, pallet liner 202, and pallet liner 204 may be the same or different.

As illustrated in FIG. 8, pallet liner 202 may be positioned adjacent side 50 of pallet base 38. Pallet liner 204 may be disposed opposite pallet liner 202 and may be positioned adjacent side 48 of pallet base 38. Pallet liners 202 and 204 may include pallet liner bases 206 and 208, respectively. Pallet liner base 206 may be defined by sides 210, 212, 214, and 216. Sides 210 and 212 may be spaced apart from each other and disposed opposite each other. Likewise, sides 214 and 216 may be spaced apart from each other and disposed opposite each other. Sides 214 and 216 may each connect sides 210 and 212. In one exemplary embodiment, sides 210 and 212 may be disposed generally parallel to each other and sides 214 and 216 may be disposed generally parallel to each other. In another exemplary embodiment as illustrated in FIG. 8, in which pallet liner base 206 may have a generally rectangular shape, sides 210 and 212 may be disposed generally perpendicular to sides 214 and 216.

Pallet liner base 208 may be defined by sides 220, 222, 224, and 226. Sides 220 and 222 may be spaced apart from each other and disposed opposite each other. Likewise, sides 224 and 226 may be spaced apart from each other and disposed opposite each other. Sides 224 and 226 may each connect sides 220 and 222. In one exemplary embodiment, sides 220 and 222 may be disposed generally parallel to each other and sides 224 and 226 may be disposed generally parallel to each other. In another exemplary embodiment as illustrated in FIG. 8, in which pallet liner base 208 may have a generally rectangular shape, sides 220 and 222 may be disposed generally perpendicular to sides 224 and 226.

In the exemplary embodiment illustrated in FIG. 8, side 214 of pallet liner base 206 has been shown as abutting on side 226 of pallet liner base 208. It is contemplated, however, that sides 214 and 226 may be spaced apart from each other and may be separated by a gap (not shown). It is contemplated that pallet liner bases may have equal or unequal areas.

Pallet liner bases 206 and 208 may include one or more notches 98. As illustrated in the exemplary embodiment of FIG. 8, notches 98 may be disposed along sides 210 and 212 of pallet liner base 206. Likewise, notches 98 may be disposed along sides 220 and 222 of pallet liner base 208. A spacing between notches 98 on one or more of sides 210, 212, 220, and 222 may be uniform or non-uniform. It is also contemplated that a number of notches 98 along one or more of sides 210, 212, 220, and 222 may be equal or unequal. Notches 98 on opposing sides 210 and 212, and/or 220 and 222 may be disposed directly opposite each other or in a staggered arrangement relative to each other. As discussed above with respect to cargo pallet 30, connectors 42 may engage with pallet base 38 and notches 98 of pallet liner bases 206 and 208 to detachably attach pallet liners 202 and 204 to pallet base 38 in cargo pallet 200.

Pallet liner 202 may include pallet extension 232. Likewise, pallet liner 204 may include pallet extension 234. Pallet extensions 232 and 234 may be fixedly attached to pallet liner bases 206 and 208, respectively. As illustrated in the exemplary embodiment of FIG. 8, pallet extensions 232 and 234 may be disposed opposite each other and may be spaced apart from each other. For example, pallet extension 232 may be fixed to pallet liner base 206 at side 216 of pallet liner base 206. Likewise, pallet extension 234 may be fixed to pallet liner base 208 at side 224 of pallet liner base 208. Pallet extensions 232 and 234 may include support surfaces 236 and 238, respectively, which may support one or more packages 180. As illustrated in FIG. 8, support surfaces 236 and 238 of pallet extensions 232 and 234, respectively may be fixed to pallet liner bases 206 and 208 at sides 216 and 224, respectively. Pallet extension 232 and support surface 236 may at least in part extend outwardly beyond a footprint of pallet liner base 206 and also beyond a footprint of pallet base 38. In one exemplary embodiment as illustrated in FIG. 8, the footprint of pallet liner base 206 may be defined by sides 210, 212, 214, and 216. Likewise, pallet extension 234 and support surface 238 may at least in part extend outwardly beyond a footprint of pallet liner base 208 and also beyond a footprint of pallet base 38. In one exemplary embodiment as illustrated in FIG. 8, the footprint of pallet liner base 208 may be defined by sides 220, 222, 224, and 226.

As also illustrated in the exemplary embodiment of FIG. 8, pallet extensions 232 and 234 and support surfaces 236 and 238, respectively, may be generally inclined relative to pallet liner bases 206 and 208, respectively. In one exemplary embodiment, pallet extension 232 and support surface 236 may be inclined at an angle ranging between about 30° and about 45° relative to pallet liner base 206. Likewise, pallet extension 234 and support surface 238 may be inclined at an angle ranging between about 30° and about 45° relative to pallet liner base 208. It is also contemplated that in some embodiments, pallet extensions 232 and 234 and support surfaces 236 and 238 may be generally co-planar with pallet liner bases 206 and 208, respectively. In yet other exemplary embodiments, pallet extension 232 and support surface 236 may be disposed generally perpendicular to pallet liner base 206, and/or pallet extension 234 and support surface 238 may be disposed generally perpendicular to pallet liner base 208. In one exemplary embodiment as illustrated in FIG. 8, pallet extensions 232 and 234 and support surfaces 236 and 238 may have generally rectangular shapes. It is contemplated, however, that pallet extensions 232 and 234 and support surfaces 236 and 238 may have triangular, polygonal, circular, elliptical, or other shapes. In some exemplary embodiments, pallet extensions 232 and 234 may be connected only to pallet liner bases 206 and 208, respectively, without being connected to any portion of pallet base 38. In other exemplary embodiments, one or both of pallet extensions 232 and 234 may be connected to pallet base 38 via one or more structural supports or struts 120. For example, pallet extension 232 may be connected to rail 58 disposed on side 50 of pallet base 38, and pallet extension 234 may be connected to rail 58 disposed on side 48 of pallet base 38.

Figure 9:
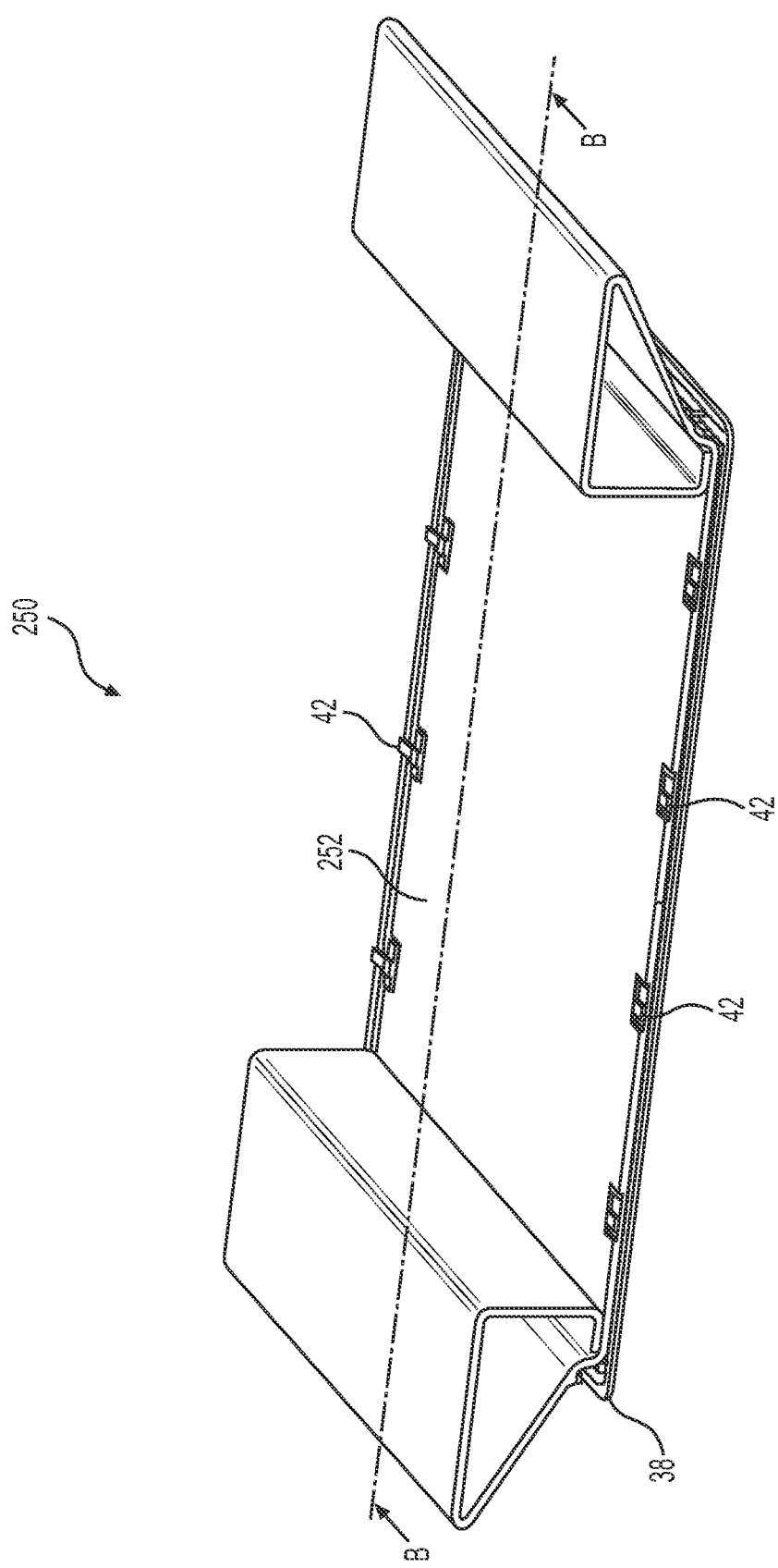
FIG. 9 is a perspective view of yet another exemplary disclosed cargo pallet.

FIG. 9 illustrates a perspective view of cargo pallet 250. As illustrated in FIG. 9, cargo pallet 250 may include pallet base 38, pallet liner 252, and one or more connectors 42. Pallet liner 252 may be positioned on pallet base 38. Positioning pallet liner 252 on pallet base 38 may include placing pallet liner 252 on pallet base 38. Positioning pallet liner 252 on pallet base 38 may at least partially define a space for receiving cargo. For example, pallet base 38 and pallet liner 252 may define a space in which packages 180 may be arranged for loading in cargo hold 10. Positioning pallet liner 252 on pallet base 38 may increase the available space in which a shipper may stack packages 180 on cargo pallet 250. Additionally, pallet liner 252 may provide additional structural support on at least two sides of cargo pallet 250 so that packages 180 may be stacked on top of each other without the packages 180 falling from or being dislodged from cargo pallet 250.

In one exemplary embodiment as illustrated in FIG. 9, pallet liner 252 may be detachably connected to pallet base 38 via one or more connectors 42. It is contemplated, however, that pallet liner 252 may be fixedly attached to pallet base 38 by, for example, riveting, welding, brazing, with an adhesive, or by any other means of attachment. It is also contemplated that in some exemplary embodiments, pallet liner 252 may be positioned on pallet base 38 without being fixedly or detachably connected to pallet base 38. Pallet base 38 and pallet liner 252 have been illustrated in FIG. 9 as having generally rectangular shapes. It is contemplated, however, that pallet base 38 and pallet liner 252 may have any shape. It is also contemplated that a shape of pallet liner 252 may be the same as or different from that of pallet base 38.

Figure 10:
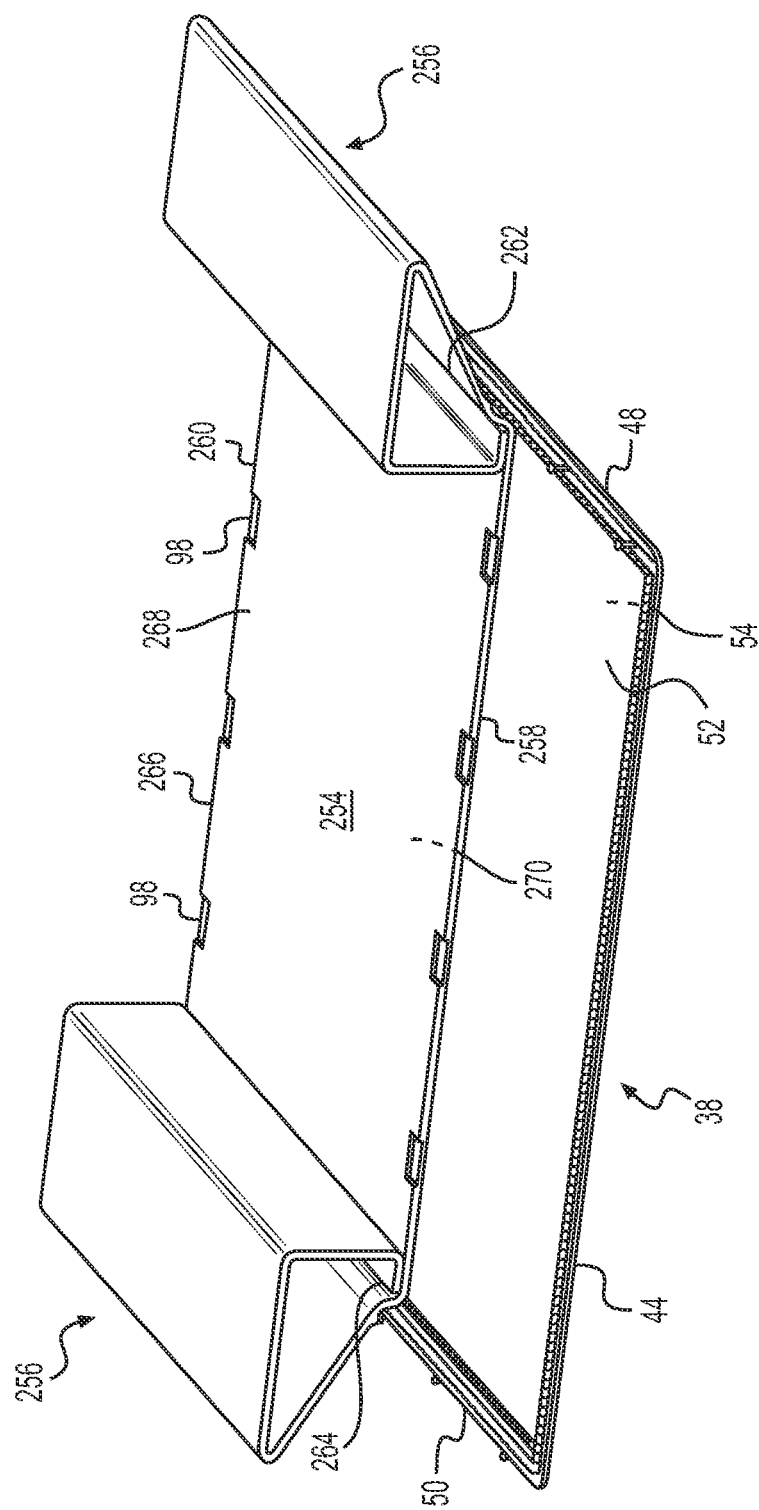
FIG. 10 is an exploded perspective view of the exemplary disclosed cargo pallet of FIG. 9.

FIG. 10 illustrates an exploded perspective view of cargo pallet 250, showing pallet base 38 and pallet liner 252. Connectors 42 have been omitted from FIG. 10 to improve clarity. Pallet liner 252 may include pallet liner base 254 and one or more pallet extensions, which may take the form of shelves or platforms 256. In one exemplary embodiment as illustrated in FIG. 10, pallet liner base 254 may have a shape defined by sides 258, 260, 262, and 264. Sides 258, 260, 262, and 264 may define an outer periphery 266 of pallet liner base 254. Sides 258 and 260 may be spaced apart from each other and may be disposed opposite each other. Sides 262 and 264 may also be spaced apart from each other and may be disposed opposite each other. Sides 262 and 264 may each connect sides 258 and 260. In one exemplary embodiment, sides 258 and 260 may be disposed generally parallel to each other, and sides 262 and 264 may be disposed generally parallel to each other. In another exemplary embodiment as illustrated in FIG. 10, in which pallet liner base 254 may have a generally rectangular shape, sides 258 and 260 may be disposed generally perpendicular to sides 262 and 264. As also illustrated in the exemplary embodiment of FIG. 10, sides 258, 260, 262, and 264 of pallet liner base 254 may be disposed generally parallel to sides 44, 46, 48, and 50, respectively, of pallet base 38. Pallet liner base 254 may also include liner upper surface 268 and liner lower surface 270, which may be disposed opposite liner upper surface 268 of pallet base 38. In one exemplary embodiment pallet liner 252 may be disposed on pallet base 38 so that liner lower surface 270 may abut on upper surface 52 of pallet base 38. A size and shape of pallet liner base 254 may be about equal to or different from a size and shape of pallet base 38.

Pallet liner base 254 may include one or more notches 98. As illustrated in the exemplary embodiment of FIG. 10, notches 98 may be disposed along sides 258 and 260 of pallet liner base 254. Notches 98 on pallet liner base 254 may have a similar shape, structure, distribution, and function as described above regarding notches 98 on pallet liner base 80. As also illustrated in the exemplary embodiment of FIG. 10, platforms 256 may project outward from an outer periphery 266 of pallet liner base 254. Platforms 256 may be fixedly attached to pallet liner base 254. As illustrated in the exemplary embodiment of FIG. 10, platforms 256 may be fixed to outer periphery 266 of pallet liner base 254 at each of sides 262 and 264 of pallet liner base 254. Platforms 256 may at least in part extend outwardly beyond a footprint of pallet liner base 254 and also beyond a footprint of pallet base 38. In one exemplary embodiment as illustrated in FIG. 10, the footprint of pallet liner base 254 may be defined by sides 258, 260, 262, and 264.

Figure 11A:
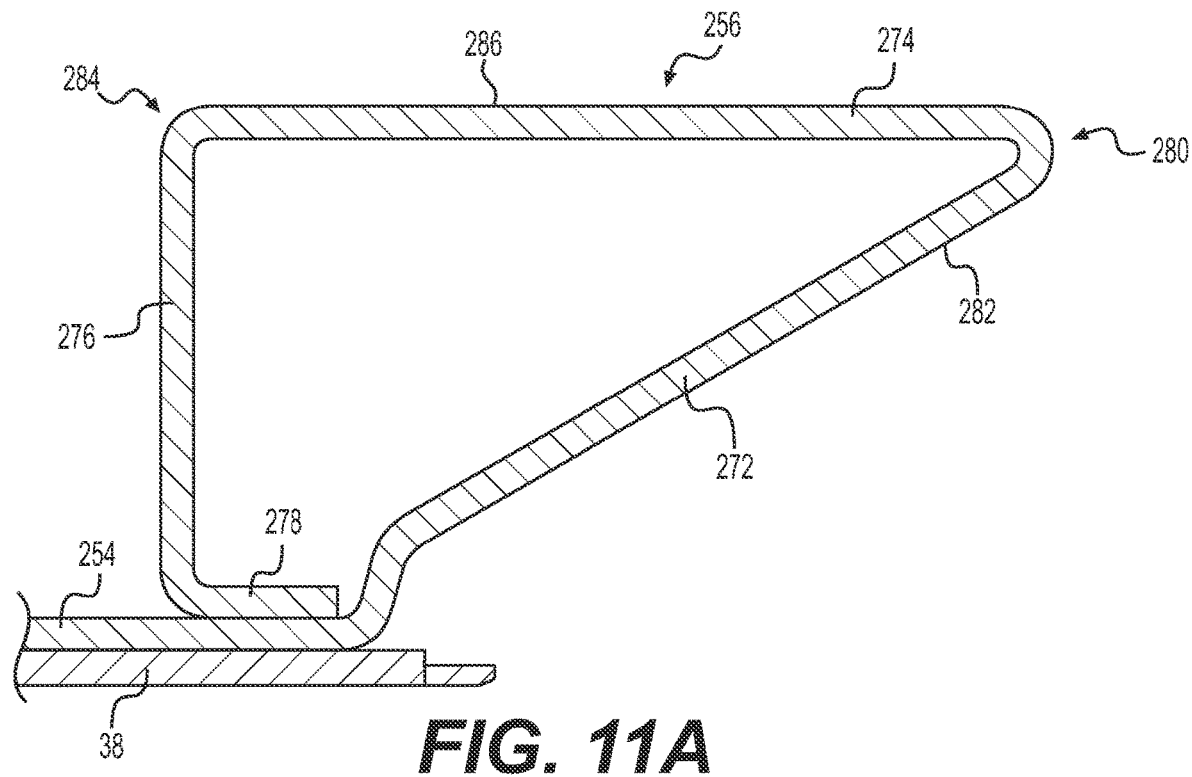
FIG. 11A is a fragmentary cross-sectional view of the exemplary cargo pallet of FIG. 9.

FIG. 11A illustrates a fragmentary cross-sectional view along axis B-B (see FIG. 9) of an exemplary embodiment of cargo pallet 250. Only one platform 256 is illustrated in FIG. 11A for clarity. Pallet liner base 254 may be positioned on pallet base 38. As illustrated in the exemplary embodiment of FIG. 11A, platform 256 may be attached only to pallet liner base 254 without being connected to any portion of pallet base 38. Platform 256 may include side plate 272, support plate 274, wall 276, and bottom wall or seating member 278. Side plate 272 may be fixed to pallet liner base 254 and may extend outwardly from pallet liner base 254 to side wall end 280, which may be disposed outside periphery 266 of pallet liner base 254. Side plate 272 may include outer surface 282. Side plate 272 and outer surface 282 of side plate 272 may be generally inclined relative to pallet liner base 254. In one exemplary embodiment, side plate 272 and outer surface 282 may be inclined at an angle ranging between about 30° and about 45° relative to pallet liner base 254.

Support plate 274 may extend inwards from side wall end 280 towards a center of pallet liner base 254. Support plate 274 may extend from side wall end 280 to support plate end 284 which may lie within outer periphery 266, between sides 262 and 264 of pallet liner base 254. In one exemplary embodiment as illustrated in FIG. 11A, support plate 274 may be disposed generally parallel to pallet liner base 254. It is contemplated, however, that in some exemplary embodiments, support plate 274 may be inclined relative to pallet liner base 254. Support plate 274 may include support surface 286 which may be used to support and stack packages 180 on platform 256. Support surface 286 may help increase an amount of space available on cargo pallet 250 for stacking packages 180.

Wall 276 may extend from support plate end 284 towards pallet liner base 254. In one exemplary embodiment as illustrated in FIG. 11A, wall 276 may be disposed generally perpendicular to pallet liner base 254. It is contemplated, however, that in some exemplary embodiments, wall 276 may be inclined relative to pallet liner base 254. Seating member 278 may extend from wall 276. Seating member 278 may be disposed generally parallel to pallet liner base 254. As illustrated in FIG. 11A, seating member 278 may abut on liner upper surface 268. In one exemplary embodiment, side plate 272, support plate 274, wall 276, and seating member 278 may form a generally triangular shape, which may help distribute the loads and stresses generated due to a weight of packages 180 stacked on to platform 256. As a result, no additional support structures connected between platform 256 and pallet base 38 may be required to carry the weight of packages 180 stacked on platform 256. In another exemplary embodiment, pallet liner base 254, side plate 272, support plate 274, wall 276, and seating member 278 may be a unitary integrated structure. The unitary integrated structure may also help to distribute the loads and stresses generated due to a weight of packages 180 stacked on to platform 256 such that no additional support structures connected between platform 256 and pallet base 38 may be required to carry the weight of packages 180 stacked on platform 256. In other exemplary embodiments, pallet liner base 254, side plate 272, support plate 274, wall 276, and seating member 278 may be fixedly or movably attached to each other via fasteners, rivets, hinges, or other attachment methods. It is also contemplated that platform 256 including side plate 272, support plate 274, wall 276, and seating member 278 may be separate from pallet liner base 254 and may be fixedly or detachably attached to pallet liner base 254 via fasteners, rivets, hinges, or other attachment methods.

Figure 11B:
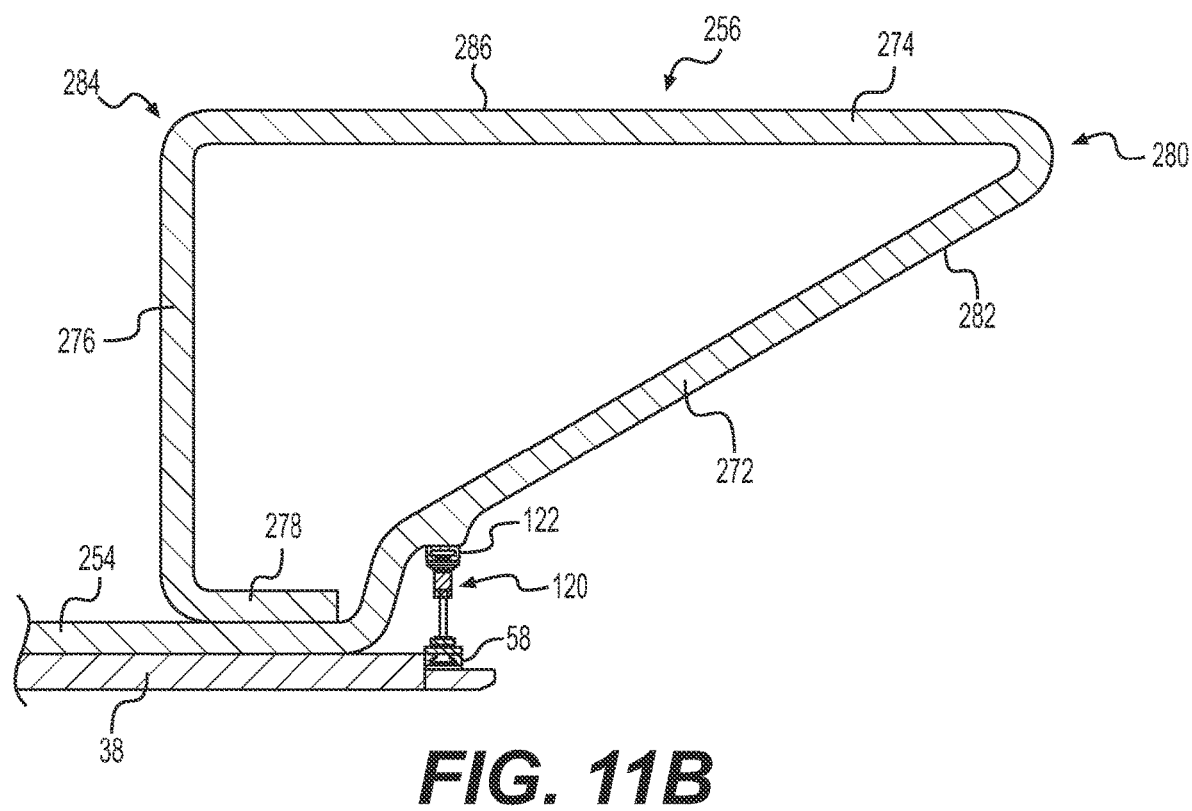
FIG. 11B is a fragmentary cross-sectional view illustrating an exemplary structural support or strut which may be used with the cargo pallet of FIG. 9.

FIG. 11B illustrates a fragmentary cross-sectional view along axis B-B (see FIG. 9) of another exemplary embodiment of cargo pallet 250. Only one platform 256 is illustrated in FIG. 11B for clarity. As illustrated in FIG. 11B, pallet liner base 254 may be positioned on pallet base 38. Platform 256 may be fixed to pallet liner base 254 and may extend outwardly from pallet liner base 254. Platform 256 may be connected to pallet base 38 via one or more struts 120, which may be configured to support a weight of packages 180 loaded on pallet liner 252 and platform 256. For example, platform 256 may be connected to rail 58 on one or both of sides 48 and 50 of pallet base 38 via one or more struts 120. As illustrated in FIG. 11B, platform 256 may include rail 122 disposed on outer surface 282 of side plate 272. Rail 122 of platform 256 may have a similar shape, structure, and function like rail 58 of pallet extension 82 discussed above in connection with FIGS. 6B and 6C.

Platform 256 of pallet liner 252 may be connected to pallet base 38 in many different ways. For example, in some exemplary embodiments, a unitary structural member may be fastened on one end to rail 58 of pallet base 38 and on an opposite end to rail 122 of platform 256 via one or more fasteners. In another exemplary embodiment, the unitary structural member may be welded or brazed on one end to rail 58 of pallet base 38 and on an opposite end to side plate 272 of platform 256. Many other types of structural supporting members may be interposed between pallet base 38 and side plate 272 of platform 256 to provide additional support to platform 256.

Figure 12:
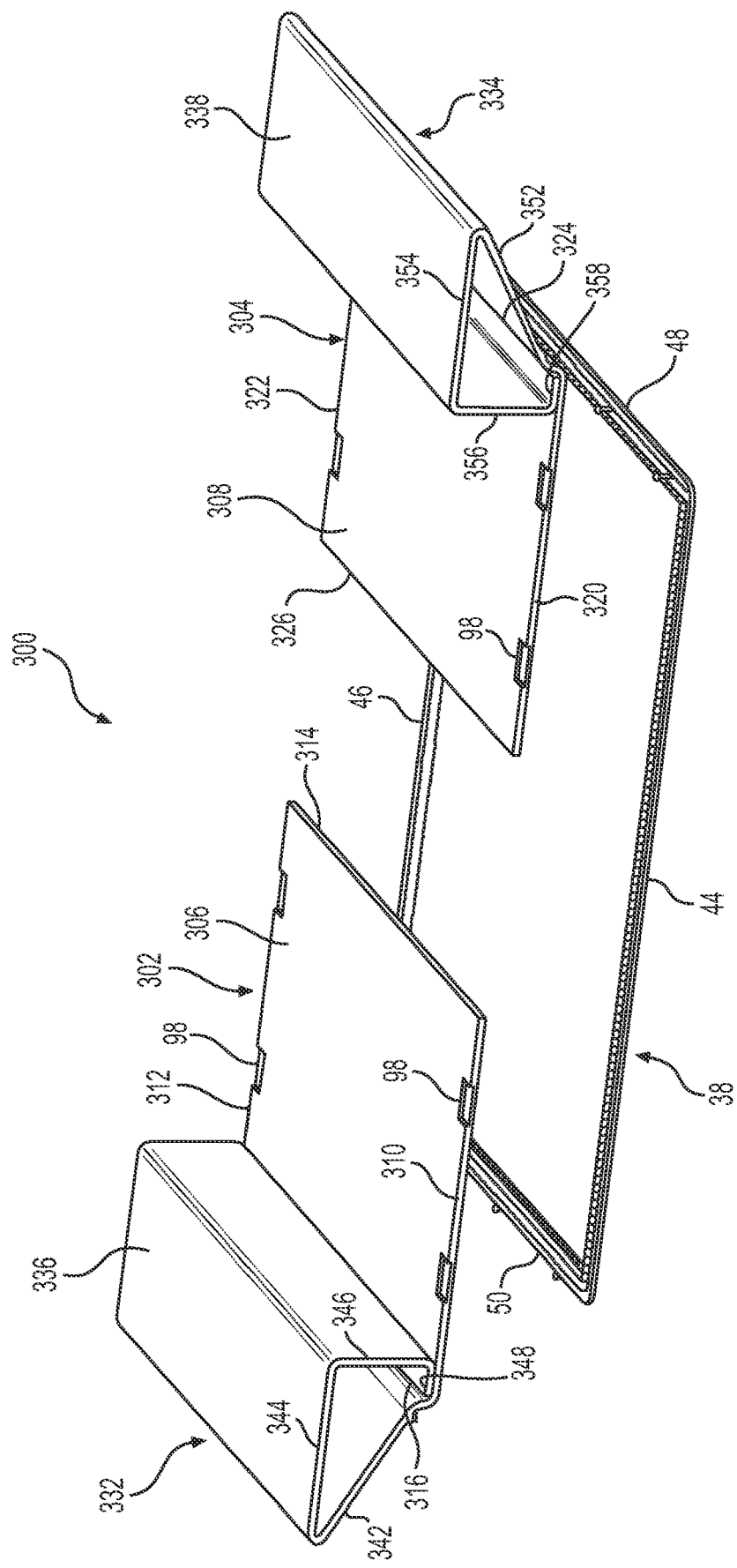
FIG. 12 is an exploded perspective view of yet another exemplary disclosed cargo pallet.

FIG. 12 illustrates an exploded perspective view of an exemplary cargo pallet 300. Cargo pallet 300 includes pallet base 38, pallet liners 302 and 304, and connectors 42, which have been omitted from FIG. 12 to improve clarity. Pallet liners 302 and 304 may be positioned on pallet base 38. Positioning pallet liners 302 and 304 on pallet base 38 may include placing pallet liners 302 and 304 on pallet base 38. Positioning pallet liners 302 and 304 on pallet base 38 may at least partially define a space for receiving cargo. For example, pallet base 38 and pallet liners 302 and 304 may define a space in which packages 180 may be arranged for loading in cargo hold 10. Positioning one or more of pallet liners 302 and 304 on pallet base 38 may increase the available space in which a shipper may stack packages 180 on cargo pallet 300. Additionally, pallet liners 302 and 304 may provide additional structural support on at least two sides of cargo pallet 300 so that packages 180 may be stacked on top of each other without the packages 180 falling from or being dislodged from cargo pallet 300.

In one exemplary embodiment, pallet liners 302 and 304 may be detachably connected to pallet base 38 via one or more connectors 42. It is contemplated, however, that pallet liners 302 and 304 may be fixedly attached to pallet base 38 by, for example, riveting, welding, brazing, with an adhesive, or by any other means of attachment. It is also contemplated that in some exemplary embodiments, pallet liners 302 and 304 may be positioned on pallet base 38 without being fixedly or detachably connected to pallet base 38. Pallet liners 302 and 304 have been illustrated in FIG. 12 as having generally rectangular shapes. It is contemplated, however, that pallet liners 302 and 304 may have any shape. It is also contemplated that the sizes and shapes of pallet base 38, pallet liner 302, and pallet liner 304 may be the same or different.

As illustrated in FIG. 12, pallet liner 302 may be positioned adjacent side 50 of pallet base 38. Pallet liner 304 may be disposed opposite pallet liner 302 and may be positioned adjacent side 48 of pallet base 38. Pallet liners 302 and 304 may include pallet liner bases 306 and 308, respectively. Pallet liner base 306 may be defined by sides 310, 312, 314, and 316. Sides 310 and 312 may be spaced apart from each other and disposed opposite each other. Likewise, sides 314 and 316 may be spaced apart from each other and disposed opposite each other. Sides 314 and 316 may each connect sides 310 and 312. In one exemplary embodiment, sides 310 and 312 may be disposed generally parallel to each other and sides 314 and 316 may be disposed generally parallel to each other. In another exemplary embodiment as illustrated in FIG. 12, in which pallet liner base 306 has a generally rectangular shape, sides 310 and 312 may be disposed generally perpendicular to sides 314 and 316.

Pallet liner base 308 may be defined by sides 320, 322, 324, and 326. Sides 320 and 322 may be spaced apart from each other and disposed opposite each other. Likewise, sides 324 and 326 may be spaced apart from each other and disposed opposite each other. Sides 324 and 326 may each connect sides 320 and 322. In one exemplary embodiment, sides 320 and 322 may be disposed generally parallel to each other and sides 324 and 326 may be disposed generally parallel to each other. In another exemplary embodiment as illustrated in FIG. 12, in which pallet liner base 308 has a generally rectangular shape, sides 320 and 322 may be disposed generally perpendicular to sides 224 and 226. It is contemplated that sides 314 and 326 may abut on each other or be spaced apart from each other. Pallet liner bases 306 and 308 may have equal or unequal areas.

Pallet liner bases 306 and 308 may include one or more notches 98. As illustrated in the exemplary embodiment of FIG. 12, notches 98 may be disposed along sides 310 and 312 of pallet liner base 306. Likewise, notches 98 may be disposed along sides 320 and 322 of pallet liner base 308. A spacing between notches 98 on one or more of sides 310, 312, 320, and 322 may be uniform or non-uniform. It is also contemplated that a number of notches 98 along one or more of sides 310, 312, 320, and 322 may be equal or unequal. Notches 98 on opposing sides 310 and 312, and/or 320 and 322 may be disposed directly opposite each other or in a staggered arrangement relative to each other. As discussed above with respect to cargo pallet 30, connectors 42 may engage with pallet base 38 and notches 98 of pallet liner bases 306 and 308 to detachably attach pallet liners 302 and 304 to pallet base 38 in cargo pallet 300.

Pallet liner 302 may include shelf or platform 332. Likewise, pallet liner 304 may include shelf or platform 334. Platforms 332 and 334 may be fixedly attached to pallet liner bases 306 and 308, respectively. As illustrated in the exemplary embodiment of FIG. 12, platforms 332 and 334 may be disposed opposite each other and may be spaced apart from each other. For example, platform 332 may be fixed to pallet liner base 306 at side 316 of pallet liner base 306. Likewise, platform 334 may be fixed to pallet liner base 308 at side 324 of pallet liner base 308. Platforms 332 and 334 may include support surfaces 336 and 338, respectively, which may support one or more packages 180. As illustrated in FIG. 12, support surfaces 336 and 338 of platforms 332 and 334, respectively may be fixed to pallet liner bases 306 and 308 at sides 316 and 324, respectively. Platform 332 and support surface 336 may at least in part extend outwardly beyond a footprint of pallet liner base 306 and also beyond a footprint of pallet base 38. In one exemplary embodiment as illustrated in FIG. 12, the footprint of pallet liner base 306 may be defined by sides 310, 312, 314, and 316. Platform 334 and support surface 338 may at least in part extend outwardly beyond a footprint of pallet liner base 308 and also beyond a footprint of pallet base 38. In one exemplary embodiment as illustrated in FIG. 12, the footprint of pallet liner base 308 may be defined by sides 320, 322, 324, and 326.

Each of platforms 332 and 334 may have a shape, structure, and function similar to that of platform 256 described above. For example, as illustrated in FIG. 12, platform 332 may include side plate 342, support plate 344, wall 346, and seating member 348, which may have a shape, structure, and function similar to that of side plate 272, support plate 274, wall 276, and seating member 278, respectively, of platform 256. Likewise, platform 334 may include side plate 352, support plate 354, wall 356, and seating member 358, which may have the a shape, structure, and function similar to that of side plate 272, support plate 274, wall 276, and seating member 278, respectively, of platform 256. Side plates 342 and 352 of platforms 332 and 334, respectively, may be inclined relative to pallet liner bases 306 and 308, respectively. In one exemplary embodiment, side plates 342 and 352 may be inclined at an angle ranging between about 30° and about 45° relative to pallet liner bases 306 and 308, respectively.

The disclosed cargo pallet includes pallet extensions that can increase the support surface for a cargo load and can include shapes that fit within the cargo hold into which the cargo pallets are to be placed, once loaded. The cargo pallet can include a pallet base and a pallet liner that can be placed onto the pallet base. The pallet extensions can be part of the pallet base and can be sized and shaped so as to extend outwardly beyond the footprint of the pallet base, once the pallet liner is placed on the pallet base. The pallet liner may be a single pallet liner that is placed onto the entire top surface of the pallet base, or it can be formed of two or more pieces that can be placed onto the pallet base. The cargo pallet can include attachment features, such as a bracket, to detachably connect the pallet liner (with its extensions) onto the pallet base. The cargo pallet can also include structural components, such as one or more struts, that permit the pallet extensions to be supported by the integral structure of the pallet liner, with its extension(s) and also by the pallet base, through the struts or other structural supports. The strut can be adjustable to further refine the structural integrity and strength of the resultant combination. The cargo pallet also includes attachment features, for example on the exterior perimeter of the pallet base, which can be applied to hold netting placed over the load of packages and materials placed onto the cargo pallet, before the cargo pallet is then loaded into a cargo hold.

The disclosed cargo pallet and its components can be standardized and readily stacked and stored, or transported, when not in use. The components can be arranged together to form cargo pallets for particular cargo holds and packaging applications. After the cargo pallets are used to ship a given load, the components can be used again, as assembled, or can be disassembled and stored, or transported, for later assembly and use.

Figure 13:
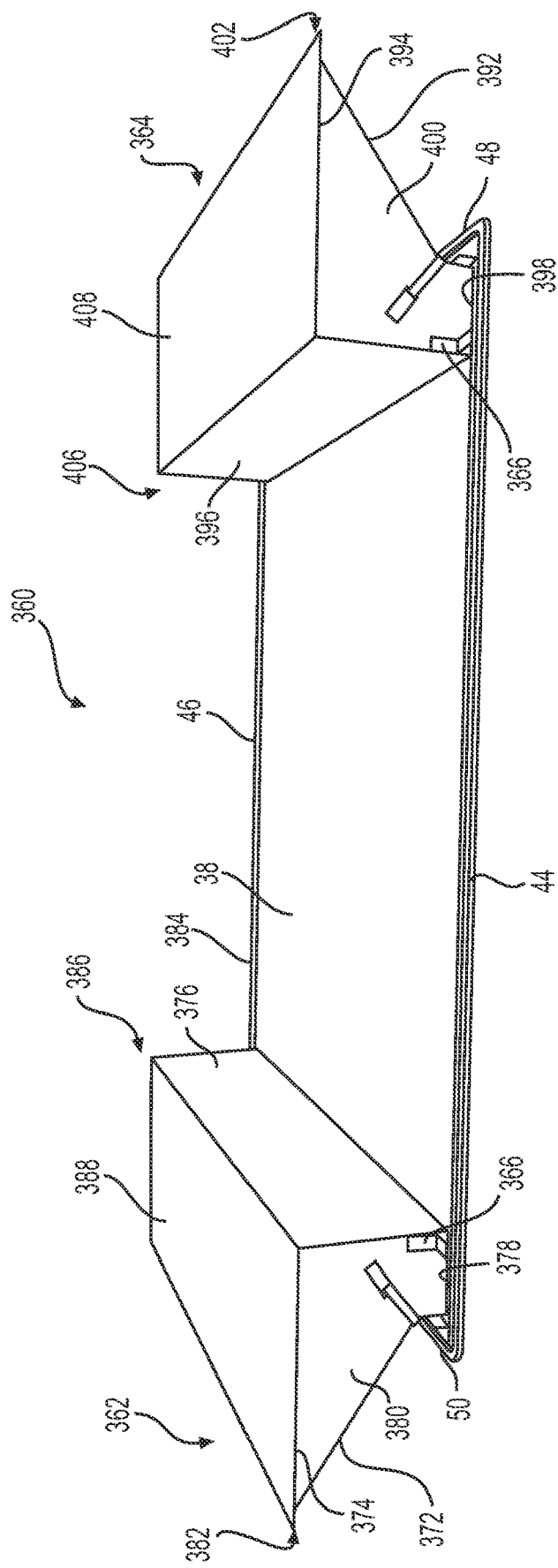
FIG. 13 is a perspective view of another exemplary disclosed cargo pallet.

FIG. 13 illustrates a perspective view of cargo pallet 360. As illustrated in FIG. 13, cargo pallet 360 may include pallet base 38 and platforms 362 and 364 disposed opposite to and spaced apart from each other. Platforms 362 and 364 may be positioned on pallet base 38. Positioning platforms 362 and 364 on pallet base 38 may at least partially define a space for receiving cargo. For example, pallet base 38 and platforms 362 and 364 may define a space in which packages 180 may be arranged for loading in cargo hold 10. Positioning platforms 362 and 364 on pallet base 38 may increase the available space in which a shipper may stack packages 180 on cargo pallet 360. Additionally, platforms 362 and 364 may provide additional structural support on at least two sides of cargo pallet 360 so that packages 180 may be stacked on top of each other without the packages 180 falling from or being dislodged from cargo pallet 360.

In one exemplary embodiment as illustrated in FIG. 13, platforms 362 and 364 may be detachably connected to pallet base 38 via one or more connectors 366. It is contemplated, however, that platforms 362 and 364 may be fixedly attached to pallet base 38 by, for example, riveting, welding, brazing, with an adhesive, or by any other means of attachment. Platforms 362 and 364 have been illustrated in FIG. 13 as spanning an entire width of pallet base 38 along sides 48 and 50 of pallet base 38. It is contemplated, however, that platforms 362 and 364 may be longer than or shorter than a width of pallet base 38. It is also contemplated that platforms 362 and 364 may be disposed along sides 44 and 46 of pallet base 38. In some exemplary embodiments, platforms 362 or 364 may be disposed along two or more of sides 44, 46, 48, and 50 of pallet base 38. Sides 44, 46, 48, and 50 may define an outer periphery 384 of pallet base 38.

As illustrated in the exemplary embodiment of FIG. 13, platform 362 may include side plate 372, support plate 374, end wall 376, bottom wall or platform base 378, and side walls 380. Side plate 372 may be fixed to platform base 378 and may extend outwardly from platform base 378 to side wall end 382, which may be disposed outside periphery 384 of pallet base 38. Side plate 372 may be generally inclined relative to pallet base 38. In one exemplary embodiment, side plate 372 may be inclined at an angle ranging between about 30° and about 45° relative to pallet base 38.

Support plate 374 may be connected to side plate 372 and to side wall end 382 and may extend inward from side wall end 382 towards a center of pallet base 38. Support plate 374 may extend from side wall end 382 to support plate end 386 which may lie within periphery 384, between sides 48 and 50 of pallet base 38. In one exemplary embodiment as illustrated in FIG. 13, support plate 374 may be spaced apart from platform base 378 and may be disposed generally parallel to platform base 378 and to pallet base 38. It is contemplated, however, that in some exemplary embodiments, support plate 374 may be inclined relative to platform base 378 and/or pallet base 38. Support plate 374 may include support surface 388 which may be used to support and stack packages 180 on platform 362. Support surface 388 may help increase an amount of space available on cargo pallet 360 for stacking packages 180.

End wall 376 may extend from support plate end 386 towards pallet base 38. End wall 376 may be connected to support plate 374 and to platform base 378. In one exemplary embodiment as illustrated in FIG. 13, end wall 376 may be disposed generally perpendicular to pallet base 38. It is contemplated, however, that in some exemplary embodiments, end wall 376 may be inclined relative to support plate 374 and/or pallet base 38. Platform base 378 may extend from end wall 376 to side plate 372. Platform base 378 may be disposed on pallet base 38. Side walls 380 may be disposed on two opposite ends of platform 362 adjacent sides 44 and 46 of pallet base 38. For example, as illustrated in FIG. 13, side walls 380 may be attached to both ends of each of side plate 372, support plate 374, end wall 376, and platform base 378, thereby forming an enclosed structure for platform 362.

In one exemplary embodiment as illustrated in FIG. 13, side plate 372, support plate 374, end wall 376, and platform base 378 may form a generally trapezoidal shape, which may help distribute the loads and stresses generated due to a weight of packages 180 stacked on to platform 362. As a result, no additional support structures connected between platform 362 and pallet base 38 may be required to carry the weight of packages 180 stacked on platform 362. In some exemplary embodiments, side plate 372, support plate 374, end wall 376, and platform base 378 may be fixedly or movably attached to each other via fasteners, rivets, hinges, by welding, by brazing, or by other attachment methods. It is also contemplated that platform 362 including side plate 372, support plate 374, end wall 376, and platform base 378 may be separate from pallet base 38 and may be fixedly or detachably attached to pallet base 38 via fasteners, rivets, hinges, or other attachment methods.

As further illustrated in the exemplary embodiment of FIG. 13, platform 364 may include side plate 392, support plate 394, end wall 396, bottom wall or platform base 398, and side walls 400. Side plate 392 may be fixed to platform base 398 and may extend outwardly from platform base 398 to side wall end 402, which may be disposed outside periphery 384 of pallet base 38. Side plate 392 may be generally inclined relative to pallet base 38. In one exemplary embodiment, side plate 392 may be inclined at an angle ranging between about 30° and about 45° relative to pallet base 38.

Support plate 394 may be connected to side wall 392 and to side wall end 400 and may extend inwards from side wall end 402 towards a center of pallet base 38. Support plate 394 may extend from side wall end 402 to support plate end 406 which may lie within periphery 384, between sides 48 and 50 of pallet base 38. In one exemplary embodiment as illustrated in FIG. 13, support plate 394 may be spaced apart from platform base 398 and may be disposed generally parallel to platform base 398 and pallet base 38. It is contemplated, however, that in some exemplary embodiments, support plate 394 may be inclined relative to platform base 398 and/or pallet base 38. Support plate 394 may include support surface 408 which may be used to support and stack packages 180 on platform 364. Support surface 408 may help increase an amount of space available on cargo pallet 360 for stacking packages 180.

End wall 396 may extend from support plate end 406 towards pallet base 38. End wall 396 may be connected to support plate 394 and platform base 398. In one exemplary embodiment as illustrated in FIG. 13, end wall 396 may be disposed generally perpendicular to pallet base 38. It is contemplated, however, that in some exemplary embodiments, end wall 396 may be inclined relative to platform base 398 and/or pallet base 38. Platform base 398 may extend from end wall 396 to side plate 392. Platform base 398 may be disposed on pallet base 38. Side walls 400 may be disposed on two opposite ends of platform 364 adjacent sides 44 and 46 of pallet base 38. For example, as illustrated in FIG. 13, side walls 400 may be attached on both ends of each of side plate 392, support plate 394, end wall 396, and platform base 398 thereby forming an enclosed structure for platform 364.

In one exemplary embodiment as illustrated in FIG. 13, side plate 392, support plate 394, end wall 396, and platform base 398 may form a generally trapezoidal shape, which may help distribute the loads and stresses generated due to a weight of packages 180 stacked on to platform 364. As a result, no additional support structures connected between platform 364 and pallet base 38 may be required to carry the weight of packages 180 stacked on platform 364. In one exemplary embodiment, side plate 392, support plate 394, end wall 396, and platform base 398 may be fixedly or movably attached to each other via fasteners, rivets, hinges, by welding, by brazing, or by other attachment methods. It is also contemplated that platform 364 including side plate 392, support plate 394, end wall 396, and platform base 398 may be separate from pallet base 38 and may be fixedly or detachably attached to pallet base 38 via fasteners, rivets, hinges, or other attachment methods.

Figure 14:
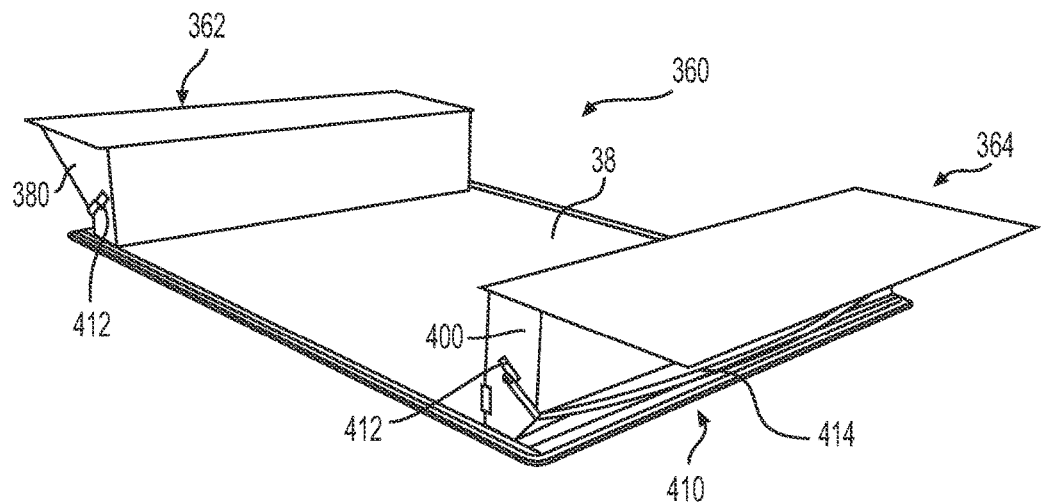
FIG. 14 is another perspective view of the exemplary cargo pallet of FIG. 13.

FIG. 14 illustrates a perspective view of cargo pallet 360. As illustrated in FIG. 14, each of platforms 362 and 364 may include a cargo net retainer 410. Cargo net retainer 410 may include end connectors 412 and strap 414. End connectors 412 may be removably attachable to projections (not shown) on side walls 380 and 400. In some exemplary embodiments end connectors 412 may be attached to side walls 380 and 400 using one or more fasteners. End connectors 412 may be removable from walls 380 and 400. Strap 414 may extend between end connectors 412 attached to side walls 380 of platform 362. Likewise, strap 414 may extend between end connectors 412 attached to side walls 400 of platform 364. In one exemplary embodiment, strap 414 may have a variable or extendable length. For example, strap 414 may be stretchable so as to tightly wrap around side plates 372 or 392 of platforms 362 and 364, respectively. End connectors 412 and straps 414 may help attach and retain cargo netting (not shown) placed over packages 180 that may be loaded on to cargo pallet 360. It is contemplated that cargo net retainer 410 may be used with one or more of the exemplary disclosed cargo pallets 30, 200, 250, 300, or 360 described above.

Figure 15:
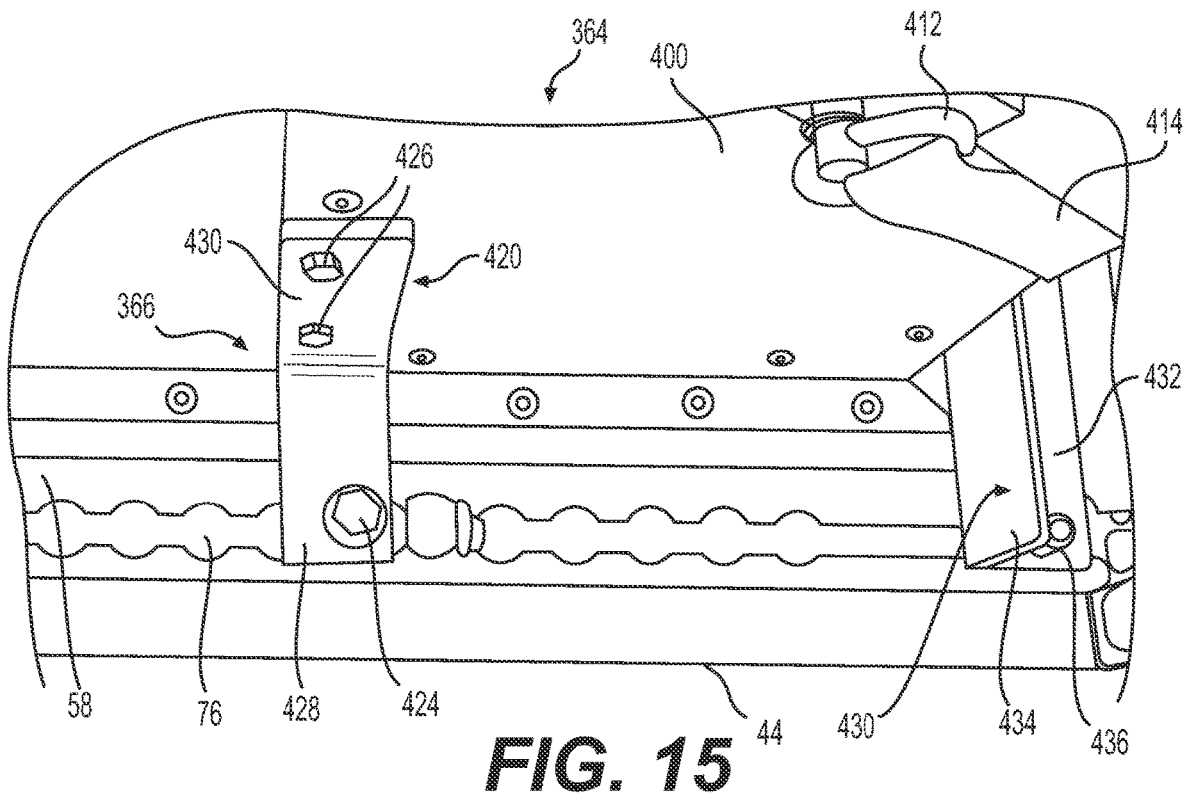
FIG. 15 is a magnified view of the attachment mechanism used to attach an exemplary platform to a pallet base of the exemplary cargo pallet of FIGS. 13 and 14.

FIG. 15 illustrates a magnified fragmentary view of side wall 400 attached to pallet base 38 via an exemplary disclosed connector 366. Connector 366 may include bracket 420 and one or more of fasteners 424 and 426. Bracket 420 may include pallet base portion 428 and platform portion 430. In one exemplary embodiment as illustrated in FIG. 15, pallet base portion 428 and platform portion 430 may both be planar plate like members, which may be disposed generally perpendicular to each other, forming a generally L-shaped bracket 420. Pallet base portion 428 may include an opening (not shown). Fastener 424 may pass through openings 76 in rail 58 of pallet base 38, and through the opening in pallet base portion 428 to attach pallet base portion 428 of bracket 420 to pallet base 38. Platform portion 430 of bracket 420 may also include one or more openings (not shown). Fasteners 426 may pass through openings in platform portion 430 of bracket 420 and through openings (not shown) in side wall 400 of platform 364 to connect platform portion 430 of bracket 420 to side wall 400. Thus, platform 364 may be attached to platform base 38 by connecting bracket 420 to rail 58 and side wall 400. FIG. 15 illustrates bracket 420 connecting side wall 400 to rail 58 on side 44 of pallet base 38. It is contemplated that brackets 420 may also be used to connect side wall 400 to rail 58 on side 46 of pallet base 38. Likewise, it is contemplated that brackets 420 may be used to connect side walls 380 of platform 362 to sides 44 and 46 of pallet base 38.

In one exemplary embodiment as illustrated in FIG. 15, cargo pallet 360 may also include support beam 430. Like bracket 420, support beam 430 may include base portion 432 and platform portion 434. In one exemplary embodiment as illustrated in FIG. 15, base portion 432 and platform portion 434 may both be planar plate like members, which may be disposed generally perpendicular to each other, thereby forming a generally L-shaped support beam 430. Base portion 434 may include an opening (not shown). Fastener 436 may pass through openings 76 and/or slot 60 in rail 58 on sides 44 and/or 46 of pallet base 38, and through the opening in base portion 432 to attach base portion 432 of support beam 430 to pallet base 38. In some exemplary embodiments, support beam 430 may also be attached to platform 364 via one or more fasteners (not shown). It is contemplated that another support beam 430 may also be attached to rail 58 on side 50 and may be connected to platform 362 via one or more fasteners. Brackets 420 and support beams 430 may help attach platforms 362 and 364 to pallet base 38. Brackets 420 and support beams 430 may also help distribute the loads and stresses generated due to a weight of packages 180 stacked on to platforms 362 and 364 by transferring a portion of the weight to platform base 38.

It will be apparent to those skilled in the art that various modifications and variations can be made to the disclosed cargo pallets. Other embodiments will be apparent to those skilled in the art from consideration of the specification and practice of the disclosed cargo pallets. It is intended that the specification and examples be considered as exemplary only, with a true scope being indicated by the following claims and their equivalents.

What is claimed is:

1. A cargo carrier, comprising:
   a base; and
   at least one shelf disposed on the base, the at least one shelf including:
      a bottom wall attached to the base;
      an inclined side wall connected to the bottom wall and extending beyond a footprint of the base; and
      a support surface connected to and extending from the inclined side wall; and
   a bracket having a first end connected to the base and second end connected to the at least one shelf.

2. The cargo carrier of claim 1, wherein the support surface is disposed generally parallel to the base.

3. The cargo carrier of claim 1, wherein the at least one shelf extends along a width of the base.

4. The cargo carrier of claim 3, wherein a width of the at least one shelf is smaller than the width of the base.

5. The cargo carrier of claim 1, wherein the at least one shelf further includes a wall extending from the support surface toward the bottom wall.

6. The cargo carrier of claim 5, wherein the wall is generally perpendicular to the bottom wall.

7. The cargo carrier of claim 5, wherein the at least one shelf further includes a seating member extending from the wall and abutting on the bottom wall.

8. The cargo carrier of claim 5, wherein the bottom wall, the side wall, the wall, and the support surface are arranged such that a cross-section of the at least one shelf has a generally trapezoidal shape.

9. The cargo carrier of claim 1, further including a support connected between the base and the inclined side wall.

10. The cargo carrier of claim 1, wherein the at least one shelf includes a first shelf disposed adjacent one end of the base, and a second shelf disposed adjacent an opposite end of the base.

11. The cargo carrier of claim 1, wherein the bracket is connected to the base and the at least one shelf with fasteners.

12. A cargo carrier, comprising:
    a base;
    a liner configured to be positioned on the base; and
    at least one shelf disposed adjacent one edge of the liner, the at least one shelf including:
       a bottom wall attached to the liner;
       an inclined side wall having a first edge connected to the liner and extending beyond a footprint of the liner; and
       a support surface spaced apart from the liner and connected to a second edge of the inclined side wall.

13. The cargo carrier of claim 12, further including:
    a wall connecting the bottom wall and the support surface.

14. The cargo carrier of claim 13, further including:
    an end wall connecting one end of the bottom wall and one end of the support surface.

15. The cargo carrier of claim 12, wherein a length of the liner is smaller than a length of the base.

16. The cargo carrier of claim 12, wherein a length of the liner is about equal to a length of the base.

17. The cargo carrier of claim 16, wherein the at least one shelf includes a first shelf disposed adjacent one end of the liner and a second shelf disposed adjacent an opposite end of the liner.

18. The cargo carrier of claim 12, wherein the support surface is disposed generally parallel to the bottom wall.

19. The cargo carrier of claim 12, wherein the bottom wall is fixedly attached to the liner.

20. The cargo carrier of claim 12, wherein the liner is removably attached to the base.

* * * * *